United States Patent Office 2,792,367
Patented May 14, 1957

2,792,367

PROCESS FOR BREAKING PETROLEUM EMULSIONS EMPLOYING CERTAIN OXYALKYLATION PRODUCTS DERIVED IN TURN FROM REACTIVE NITROGEN CONTAINING COMPOUNDS

Melvin De Groote, University City, and Kwan-Ting Shen, Brentwood, Mo., assignors to Petrolite Corporation, Wilmington, Del., a corporation of Delaware No Drawing. Application October 5, 1953, Serial No. 384,308

22 Claims. (Cl. 252—344)

The present invention is a continuation-in-part of our co-pending application, Serial No. 376,764, filed August 26, 1953.

This invention relates to processes or procedures particularly adapted for preventing, breaking or resolving emulsions of the water-in-oil type, and particularly petroleum emulsions.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the invention.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Attention is directed to our co-pending application, Serial No. 376,764, filed August 26, 1953, which relates to a process for breaking petroleum emulsions employing a demulsifier including products obtained by reacting certain monomeric organic nitrogen-containing compounds, therein described in detail, with certain nonaryl hydrophile polyepoxides, also therein described in detail.

The present invention relates to a process for breaking petroleum emulsions employing a demulsifier including products obtained by further oxyalkylating the reaction products of the aforementioned application with certain monoepoxides.

Our aforementioned co-pending application, Serial No. 376,764, in turn referred to two other co-pending applications, to wit, our co-pending applications Serial Nos. 305,079 (now abandoned) and 305,080 (now Patent No. 2,723,241 dated November 8, 1955), both filed August 18, 1952. In said first mentioned application it is stated that the last two aforementioned co-pending applications employ certain glycidyl ethers of the kind described in U. S. Patent No. 2,500,499, dated March 14, 1950, to Bradley, and represented by the formula:

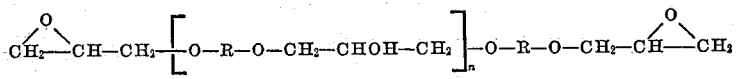

wherein R represents the divalent hydrocarbon radical of a dihydric phenol and $n$ is an integer of the series 0, 1, 2, 3, etc. More specifically, such diglycidyl ethers may be illustrated by the following formula:

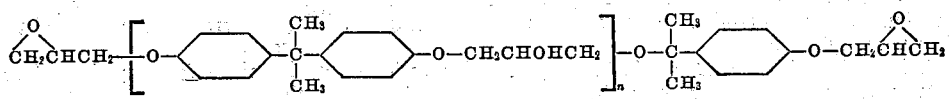

wherein $n$ is an integer of the series 0, 1, 2, 3, etc.

In contradistinction to such diglycidyl ethers which introduce an essentially hydrophobe radical or radicals, the present invention is characterized by analogous compounds derived from diglycidyl ethers which do not introduce any hydrophobe properties in its usual meaning but in fact more apt to introduce hydrophile properties. Thus, the diepoxides employed in the present invention are characterized by the fact that the divalent radical connecting the terminal epoxide radicals contains less than 5 carbon atoms in an uninterrupted chain. For comparison, reference is made to polyepoxides and more specifically diepoxides employed as the reactants in our copending applications, Serial Nos. 305,079 and 305,080, both filed August 18, 1952. Examples there described include:

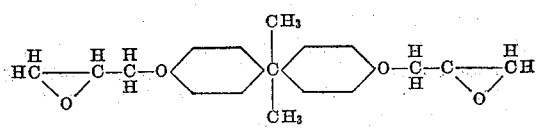

It is to be noted that in this formula the terminal epoxy radicals are separated by the divalent hydrophobe group

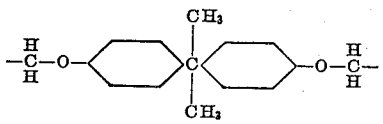

The diepoxides employed in the present invention are obtained from glycols such as ethylene glycol, diethylene glycol, propylene glycol, dipropylene glycol, tripropylene glycol, glycerol, diglycerol, triglycerol, and similar compounds. Such products are well known and are characterized by the fact that there are not more than 4 uninterrupted carbon atoms in any group which is part of the radical joining the epoxide groups. Of necessity such diepoxide must be nonaryl or aliphatic in character. The diglycidyl ethers of co-pending applications, Serial Nos. 305,079, and 305,080, are invariably and inevitably aryl in character.

The diepoxides employed in the present process are usually obtained by reacting a glycol or equivalent compound, such as glycerol or diglycerol, with epichlorohydrin and subsequently with an alkali. Such diepoxides have been described in the literature and particularly the patent literature. See, for example, Italian Patent No. 400,973, dated August 8, 1951; see, also, British Patent 518,057, dated December 10, 1938; and U. S. Patent 2,070,990, dated February 16, 1937, to Gross et al. Reference is made also to U. S. Patent No. 2,581,464, dated January 8, 1952, to Zech. This particular last mentioned patent describes a composition of the following general formula:

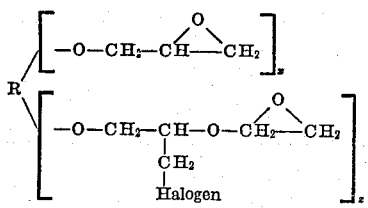

in which $x$ is at least 1, $z$ varies from less than 1 to more than 1, and $x$ and $z$ together are at least 2 and not more than 6, and R is the residue of the polyhydric alcohol remaining after replacement of at least 2 of the hydroxy groups thereof with the epoxide ether groups of the above formula, and any remaining groups of the residue being free hydroxyl groups.

It is obvious from what is said in the patent that variants can be obtained in which the halogen is replaced by a hydroxyl radical; thus, the formula would become

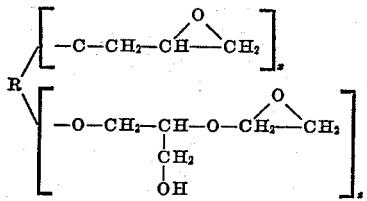

Reference to being thermoplastic characterizes them as being liquids at ordinary temperature or readily convertible liquids by merely heating below the point of pyrolysis and thus differentiates them from infusible resins. Reference to being soluble in an organic solvent means any of the usual organic solvents such as alcohols, ketones, esters, ethers, mixed solvents, etc. Reference to solubility is merely to differentiate from a reactant which is not soluble and might be not only insoluble but also infusible. Furthermore, solubility is a factor insofar that it sometimes is desirable to dilute the compound containing the epoxy rings before reacting with an amine as described. In such instances, of course, the solvent selected would have to be one which is not susceptible to oxyalkylation as, for example, kerosene, benzene, toluene, dioxane, possibly various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distingush it from other epoxy rings. Hereinafter the word "epoxy" unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxide rings or oxirane rings in the alpha-omega positions. This is a departure from the standpoint of strictly formal nomenclature as in the example of the simplest diepoxide which contains at least 4 carbon atoms and is formally described as 1,2-epoxy-3,4-epoxybutane (1,2,3,4 diepoxybutane).

It will may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric compounds containing an average of more than one epoxide group per molecule and free from functional groups other than epoxide and hydroxyl groups. The compounds here included are limited to the monomers or the low molal members of such series and generally contain two epoxide rings per molecule and may be entirely free from a hydroxyl group. This is important because the instant invention is directed towards products which are not insoluble resins and have certain solubility characteristics not inherent in the usual thermosetting resins. Note, for example, that said U. S. Patent 2,494,295 describes products wherein the epoxide derivative can combine with a sulfonamide resin. The intention in said U. S. Patent 2,494,295, of course, is to obtain ultimately a suitable resinous product having the characteristics of a comparatively insoluble resin.

Simply for purpose of illustration to show a typical diglycidyl ether of the kind herein employed reference is made to the following formula:

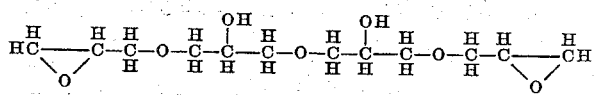

or if derived from cyclic diglycerol the structure would be thus:

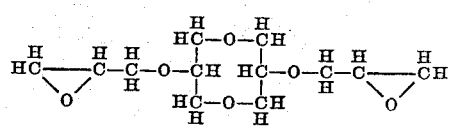

or the equivalent compound wherein the ring structure involves only 6 atoms, thus:

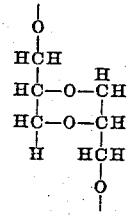

Commercially available compounds seem to be largely the former acyclic structure with comparatively small amounts, in fact, comparatively minor amounts, of the latter.

Having obtained an acyclic reactant having generally 2 epoxy rings as depicted in the next-to-last formula preceding, or low molal polymers thereof, it becomes obvious the reaction can take place with any amine having a reactive hydrogen atom. Such amines may have a hydrogen atom attached to nitrogen or to oxygen.

To illustrate the intermediate products which are employed in the present invention, reference is made to a reaction involving a mole of the diepoxide and a reactive amine. Proceeding with the example previously described it is obvious the reaction ratio, for example, 2 moles of amine and one mole of the diepoxide, gives a product which may be indicated as follows:

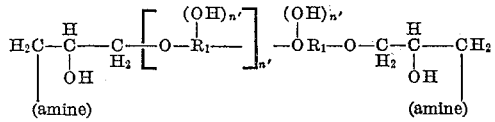

in which $n'$ is a small whole number less than 10, and usually less than 4, and including 0, and $R_1$ represents a divalent radical as previously described being free from any radical having more than 4 uninterrupted carbon atoms in a single chain.

Such intermediate product in turn also must be soluble but solubility is not limited to an organic solvent but may include water or, for that matter, a solution of water containing an acid such as hydrochloric acid, acetic acid, hydroxyacetic acid, etc. In other words, the nitrogen groups present, whether one or more, may or may not be significantly basic and it is immaterial whether aqueous solubility represents the anhydro base or the free base (combination with water), or a salt form such as the acetate, chloride, etc. The purpose in this instance is to differentiate from insoluble resinous materials, particularly those resulting from relation or cross-linking. Not only does this property serve to differentiate from instances where an insoluble material is desired, but also serve to emphasize the fact that in many instances the preferred compounds have distinct water-solubility or are distinctly soluble in 5% acetic acid, or gluconic acid. For instance, the products freed from any solvent can be shaken with 5 to 20 times their weight of distilled water at ordinary temperature and are at least self-dispersing, and in many instances water-soluble, in fact, colloidally soluble. This is particularly true when there happens to be one or more nitrogen atoms present or a repetitious ether linkage as in the case of oxyethylated or oxypropylated monoamines or polyamines.

It goes without saying that all the products obtained from any of the nitrogen-containing reactants are in turn oxyalkylation-susceptible.

The products obtained by oxyalkylation with a monoepoxide such as ethylene oxide, propylene oxide, butylene oxide or the like, can be subjected to further reaction with a product having both a nitrogen group and 1,2-epoxy group, such as 3-dialkylaminoepoxypropane. See U. S. Patent No. 2,520,093, dated August 22, 1950, to Gross.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics spray oils, water-repellent textile finishes; as lubricants, etc.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethyleneglycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

For purpose of convenience, what is said hereinafter will be divided into five parts:

Part 1 is concerned with the hydrophile nonaryl polyepoxides and particularly diepoxides employed as reactants;

Part 2 is concerned with suitable nitrogen-containing compounds to be employed for reaction with the polyepoxides;

Part 3 is concerned with the reactions involving the two preceding types of materials and examples obtained by such reaction;

Part 4 is concerned with reactions involving the intermediates obtained in the manner described in Part 3, preceding, and certain alpha-beta monoepoxides having not over 4 carbon atoms;

Part 5 is concerned with the resolution of petroleum emulsions of the water-in-oil type by means of the previously described chemical compounds or reaction products.

Part 1

Reference is made to previous patents as illustrated in the manufacture of the nonaryl polyepoxides and particularly diepoxides employed as reactants in the instant invention. More specifically, such patents are the following: Italian Patent No. 400,973, dated August 8, 1941; British Patent No. 518,057, dated December 10, 1938; U. S. Patent No. 2,070,990, dated February 16, 1937, to Groll et al.; and U. S. Patent No. 2,581,464, dated January 8, 1952, to Zech. The simplest diepoxide is probably the one derived from 1,3-butadiene or isoprene. Such derivatives are obtained by the use of peroxides or by other suitable means and the diglycidyl ethers may be indicated thus:

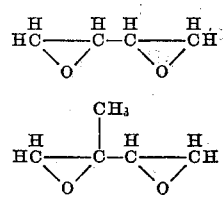

In some instances the compounds are essentially derivatives of etherized epichlorohydrin or methyl epichlorohydrin. Needless to say, such compounds can be derived from glycerol monochlorohydrin by etherization prior to ring closure. An example is illustrated in the previously mentioned Italian Patent No. 400,973:

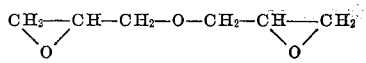

Another type of diepoxide is diisobutenyl dioxide as described in aforementioned U. S. Patent No. 2,070,990, dated February 16, 1937, to Groll, and is of the following formula:

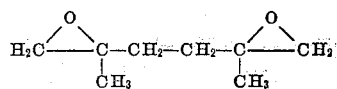

The diepoxides previously described may be indicated by the following formula:

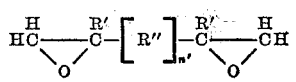

in which $R'$ represents a hydrogen atom or methyl radical and $R''$ represents the divalent radical uniting the two terminal epoxide groups, and $n'$ is the numeral 0 or 1. As previously pointed out, in the case of the butadiene derivative, $n'$ is 0. In the case of diisobutenyl dioxide $R''$ is $CH_2\text{---}CH_2$ and $n'$ is 1. In another example previously referred to $R''$ is $CH_2OCH_2$ and $n'$ is 1.

However, for pracical purposes the only diepoxide available in quantities other than laboratory quantities is a derivative of glycerol or epichlorohydrin. This particular diepoxide is obtained from diglycerol which is largely acyclic diglycerol, and epichlorohydrin or equivalent thereof in that the epichlorohydrin itself may supply the glycerol or diglycerol radical in addition to the epoxy rings. As has been suggested previously, instead of starting with glycerol or a glycerol derivative, one could start with any one of a number of glycols or polyglycols and it is more convenient to include as part of the terminal oxirane ring radical the oxygen atom that was derived from epichlorohydrin or as might be the case, methyl epichlorohydrin. So presented the formula becomes:

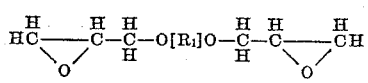

In the above formula $R_1$ is selected from groups such as the following:

$C_2H_4$
$C_2H_4OC_2H_4$
$C_2H_4OC_2H_4OC_2H_4$
$C_3H_6$
$C_3H_6OC_3H_6$
$C_3H_6OC_3H_6OC_3H_6$
$C_4H_8$
$C_4H_8OC_4H_8$
$C_4H_8OC_4H_8OC_4H_8$
$C_3H_5(OH)$
$C_3H_5(OH)OC_3H_5(OH)$
$C_3H_5(OH)OC_3H_5(OH)OC_3H_5(OH)$

It is to be noted that in the above epoxides there is a complete absence of (a) aryl radicals and (b) radicals in which 5 or more carbon atoms are united in a single uninterrupted single group. $R_1$ is inherently hydrophile in character as indicated by the fact that it is specified that the precursory diol or polyol OHROH must be water-soluble in substantially all proportions, i. e., water miscible.

Stated another way, what is said previously means that a polyepoxide such as

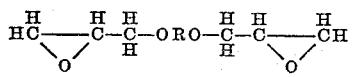

is derived actually or theoretically, or at least derivable, from the diol HOROH, in which the oxygen-linked hydrogen atoms were replaced by

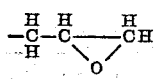

Thus, $R(OH)_n$, where $n$ represents a small whole number which is 2 or more, must be water-soluble. Such limitation excludes polyexpoxides if actually derived or theoretically derived at least, from water-insoluble diols or water-insoluble triols or higher polyols. Suitable polyols may contain as many as 12 to 20 carbon atoms or thereabouts.

Referring to a compound of the type above in the formula

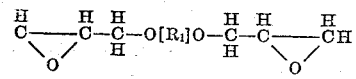

in which $R_1$ is $C_3H_5(OH)$ it is obvious that reaction with another mole of epichlorohydrin with appropriate ring closure would produce a triepoxide or, similarly, if R happened to be $C_3H_5(OH)OC_3H_5(OH)$, one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately 4 moles of epichlorohydrin yield one mole of the diglycidyl ether, or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this diepoxide will be referred to as diglycidyl ether A. Such material corresponds in a general way to the previous formula.

Using laboratory procedure we have reacted diethyleneglycol with epichlorohydrin and subsequently with alkali so as to produce a product which, on examination, corresponded approximately to the following compound:

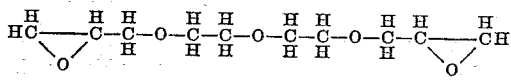

The molecular weight of the product was assumed to be 230 and the product was available in laboratory quantities only. For this reason, the subsequent table referring to the use of this particular diepoxide, which will be referred to as diglycidyl ether B, is in grams instead of pounds.

Probably the simplest terminology for these polyepoxides, and particularly diepoxides, to differentiate from comparable aryl compounds is to use the terminology "epoxyalkanes" and, more particularly, polyepoxyalkanes or diepoxyalkanes. The difficulty is that the majority of these compounds represent types in which a carbon atom chain is interrupted by an oxygen atom and, thus, they are not strictly alkane derivatives. Furthermore, they may be hydroxylated or represent a heterocyclic ring. The principal class properly may be referred to as polyepoxypolyglycerols, or diepoxypolyglycerols.

Other examples of diepoxides involving a heterocyclic ring having, for example, 3 carbon atoms and 2 oxygen atoms, are obtainable by the conventional reaction of combining erythritol with a carbonyl compound, such as formaldehyde or acetone so as to form the 5-membered ring, followed by conversion of the terminal hydroxyl groups into epoxy radicals.

PART 2

As previously noted, Part 2 is concerned with the amino reactants employed in conjunction with the polyepoxide reactant usually containing two oxirane rings. Since the reactant described in detail in Part 1, preceding, is essentially an oxyalkylating agent it is obvious that any amino compound, and more broadly any nitrogen-containing compound such as an amide, which is oxyalkylation susceptible is suitable for the present purpose. In essence, this means that the product must have a labile hydrogen attached to either oxygen or nitrogen. Such hydrogen atom may be attached directly to a nitrogen atom as in the case of an amide, an amine, or the like. However, it may be attached directly to oxygen as in the case of triethanolamine; or a labile hydrogen atom in the form of a hydroxyl group may appear in the acyl radical of an amide or the ester of an amine, such as an ester of ethanoldiethyl amine; although ricinoleic acid exemplifies an acyl radical with a hydroxyl group which is somewhat reactive, yet more satisfactory, is a hydroxy carboxylic acid such as

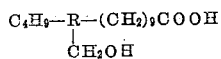

wherein R is a six-sided carbocycle of the formula $C_6H_9$, as described in U. S. Patent No. 2,457,640, dated December 28, 1948, to Bruson et al.

One need not necessarily use monoamino compounds or compounds containing a single nitrogen atom but may use polyamino compounds including, of course, compounds where there is more than one amide group. There is no limitation as to the group which is attached to the nitrogen atom insofar that it may be alkyl, aryl, alicyclic, and alkylaryl, arylalkyl, etc. Heterocyclic compounds such as morpholine may be employed. The amino compound or amido compound may be water-soluble or water-insoluble. The amine may contain a phenolic hydroxyl as, for example,

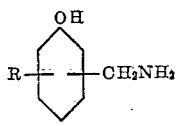

where R is an alkyl group generally having five carbon atoms or more. See U. S. Patent No. 2,410,911, dated November 12, 1946, to Wasson et al. Further examples appear in the subsequent text.

Needless to say, since it is specified that the amino compound or amido compound be oxyalkylation susceptible it can be subjected to reaction with some other alkylene oxide than the instant reactant containing the two oxirane rings, such as ethylene oxide, propylene oxide, butylene oxide, styrene oxide, glycide, glycidyl ethers of methanol, ethanol, propanol, phenol, and the like. The fact that such reactants are oxyalkylation susceptible means they are also susceptible to reaction with imines, such as ethyleneimine, propyleneimine, etc. Furthermore, any non-nitrogeneous compound which is oxyalkylation susceptible, for instance, an alcohol or a phenol, may be reacted with ethylene-imine to give suitable compounds to be employed as reactants in the present procedure. See, for example, U. S. Patent No. 2,318,729, dated May 11, 1943, to Wilson. This same procedure, of course, described in said Wilson patent can be used in conjunction with any alcohol or phenol. Indeed, water-soluble polymers of lower alkylene imines can be employed. See U. S. Patent No. 2,553,696, dated May 22, 1951, to Wilson. The imines may have ether linkages as previously noted. See, for example, the products described in U. S. Patent No. 2,325,514, dated July 27, 1943, to Hester.

As is obvious from what is said, one need not use organic compounds but inorganic compounds such as ammonia or hydrazine can be employed. In the case of amides, one is not limited to the amides of monocarboxy or polycarboxy acids but one may use sulfonamides or the amide of carbonic acid, i. e., urea. However, certain derivatives of urea appear more satisfactory than urea itself. See U. S. Patent No. 2,352,552, dated June 27, 1944, to Kienzle.

As to a variety of sulfonamides which are readily susceptible to oxyalkylation, particularly with ethylene oxide or propylene oxide, see U. S. Patent No. 2,577,256, dated December 4, 1951, to Lundsted. Such sulfonamide could be used as such or after treatment with one or more moles of ethylene oxide, propylene oxide, etc.

For purpose of convenience attention is directed to a sizable number of nitrogen-containing compounds which are available in the open market as differentiated from those which could be readily prepared by reaction with ethylene oxide, propylene oxide, ethyleneimine, etc. In some instances even these reactants, notwithstanding the fact that they do have a labile hydrogen atom, are more satisfactory after treatment with ethylene oxide so as to have the labile hydrogen atom attached to oxygen instead of nitrogen.

Amine 220 (Carbide and Carbon Chemicals Company, New York city, N. Y., designation for $C_{17}H_{33}C:NC_2H_4NC_2H_4OH$)

Amine 803 (Carbide and Carbon Chemicals Company, New York city, N. Y., designation for $C_4H_9CH(C_2H_5)CH_2OC_3H_6NH_2$)

Ethyl amine
Diethyl amine
Isopropyl amine
Diisopropyl amine
n-Butyl amine
Dibutyl amine
n-Hexyl amine
2-ethylhexyl amine
Di(2-ethylhexyl) amine
Ethylene diamine
Diethylene triamine
Triethylene tetramine
Tetraethylene pentamine
Propylene diamine
N-hydroxyethyl propylene diamine
N,N'-dihydroxyethyl ethylene diamine
2,5-dimethyl piperazine
Morpholine
N-hydroxyethyl morpholine
N-aminoethyl morpholine
N-aminopropyl morpholine
Monoethanolamine
Diethyl ethanolamine
N-butyl diethanolamine
Aminoethyl ethanolamine
Di(2-ethylhexyl)ethanolamine
Tetraethanol ammonium hydroxide
N-acetyl ethanolamine
N,N-diethyl ethylene diamine Diethanolamine
Triethanolamine
N-methyl ethanolamine
Dimethyl ethanolamine
N-ethyl ethanolamine
N-ethyl diethanolamine
N-methyl diethanolamine
n-amylamine
Di-n-amylamine
Sec-amylamine
Hexylamine
Dihexylamine
Heptylamine
Octylamine
Dioctylamine
Decylamine
Dodecylamine Monoisopropanolamine
Diisopropanolamine
Triisopropanolamine
Dimethyl isopropanolamine
Dibutyl isopropanolamine 1,3-diaminopropane
3-diethylaminopropylamine
1,3-diaminobutane
1,3-bis-ethylaminobutane
N-ethylbutylamine
2-amino-4-methylpentane
4-amino-2-butanol
1-dimethylamino-2-propanol
5-isopropylamino-1-pentanol
N-butylaniline High molecular weight aliphatic amides known as Armid 8, Armid 10, Armid 12, Armid 14, Armid 16, Armid 18, Armid HT, Armid RO, Armid T, Armid TO and Armid C, as described in a chemical pamphlet entitled "Armids," issued by Armour Chemical Division, Chicago 9, Illinois.

Similarly, secondary high molecular weight aliphatic amines known as Armeen 2C and Armeen 2HT, as described in circular entitled "Secondary Armeens," as issued by Armour Chemical Division, Chicago, Illinois.

Also, high molecular weight aliphatic amines known as Armeen 10, Armeen 16D, Armeen HTD, Armeen 18D, and Armeen CD, as described in a pamphlet entitled "Armeens," issued by Armour Chemical Division, Armour and Company, Chicago, Illinois.

Included also are fatty diamines having both primary and secondary amine groups and sold under the name Duomeens, such as Duomeen T, as described in a circular entitled "Duomeen T" issued by Armour Chemical Division, Chicago, Illinois.

Other suitable amines are primary monoamines of the type $H(OC_2H_4)_nNH_2$, where $n=3$ to 5.

Suitable amines having an aromatic ring include alpha-methylbenzylamine, alpha - methylbenzylmonoethanolamine and alphamethylbenzyl diethanolamine.

One may use tertiary alkyl primary amines such as tertiary-octylamine, alkylamine 81–R, alkylamine 81–T, alkylamine JM–R, and alkylamine JM–T. As to a description of these amines see Rohm & Haas Company, Philadelphia, Pa., pamphlet entitled "Tertiary-Alkyl Primary Amines."

Other amines include:

2-amino-2-methyl-1-propanol
2-amino-2-methyl-1,3-propanediol
2-amino-2-ethyl-1,3-propanediol
3-amino-2-methyl-1-propanol
2-amino-1-butanol
3-amino-2,2-dimethyl-1-propanol
2-amino-2,3-dimethyl-1-propanol
2,2-diethyl-2-amino ethanol
2,2-dimethyl-2-amino ethanol 3-amino-1,2-butanediol
4-amino-1,2-butanediol
2-amino-1,3-butanediol
4-amino-1,3-butanediol
4,4-dimethyl-1,3-butanediol
2-amino-1,4-butanediol
3-amino-1,4-butanediol
1-amino-2,3-butanediol
Tris-(hydroxy methyl) amino methane An additional desirable group of amines are dialiphatic-aminoalkylcardanols, and particularly those having 10 to 40 carbon atoms in the dialiphatic grouping; examples include di - 2 - ethylhexylaminomethylcardanol, diamylaminomethyl cardanol, dilaurylaminomethyl cardanol, and di-n-butylaminomethyl cardanol. See U. S. Patent No. 2,489,672, dated November 29, 1949, to Revukas.

Further examples of this same type of material and which has available both a phenolic hydroxyl and an alkanol hydroxyl is illustrated by the condensation product derived from a phenol, either monofunctional or difunctional, such as para-tertiary butylphenol, para-tertiary amylphenol, octylphenol, nonylphenol, and similar phenols having a substituent such as two butyl groups or two nonyl groups in both an ortho and the para position. Such phenols are reacted with an aldehyde, such as formaldehyde, acetaldehyde, etc. and an alkanol phenol, such as diethanolamine, ethylethanolamine, dipropanolamine, and other amyl amines having only one amino hydrogen atom. See, for example, U. S. Patent No. 2,457,634, dated December 28, 1948, to Bond et al.

Amines having ring structures of course include aniline, diphenylamine, cyclohexylamine, dicyclohexylamine, and various comparable amines with alkyl substituents in the ring and similarly such amines after treatment with ethylene oxide, propylene oxide, glycide, etc.

It is to be noted, of course, that the above description in the text immediately preceding is largely miscellaneous in character because the reference is to products available in the open market. Practically every amine which is oxyalkylation susceptible is also acylation susceptible although there are some compounds, such as amides, sulfonamides, urea, etc., which are much more readily oxyalkylation susceptible than acylation susceptible for the reason that it is much more difficult to form a secondary amide, and more especially a tertiary amide, than it would be to react a primary amide with one or more moles of an alkylene oxide.

However, U. S. Patent No. 2,571,119, dated October 16, 1951, to De Groote et al., covers essentially the same compounds herein proposed, including imidazolines and oxyalkylated imidazolines. This patent divides the nitrogen compounds into a number of classes which is convenient, when one considers the reactions discussed in Part 5, succeeding. What is said immediately hereafter is substantially the text verbatim as it appears in that patent with only the obvious change in the few introductory sentences.

Nitrogen-containing compounds which are oxyalkylation susceptible can be divided into various classes as to their structure. As has been pointed out, reactivity towards such alkylene oxides having a reactive ring, such as the oxirane ring, generally means the presence in them of either an amino nitrogen atom, amido nitrogen atom, or an alkanol radical or a phenolic radical, or the equivalent, that is, hydrogen attached to nitrogen or oxygen. In the following five classes the amides, sulfonamides, ureas, etc., are omitted but suitable reference has been made to these previously. The inorganic nitrogen compounds include ammonia, hydrazine, etc. The organic nitrogen compounds include amines, such as primary, secondary and tertiary amines, polyamines as well as monoamines, amines containing alkanol radicals or the equivalent, and amines which contain both a reactive hydrogen atom attached to oxygen and one or more reactive hydrogen atoms attached to nitrogen. For purpose of convenience the nitrogen-containing compounds employable as reactants here are divided into the following classes.

Class 1.—Ammonia and hydrazine and compounds containing only one nitrogen atom per molecule with at least one reactive hydrogen atom attached thereto, but in the absence of reactive hydroxyl groups. Primary amines like ethylamine, isopropylamine, butylamine, amylamine, hexylamine, heptylamine, octylamine, decylamine, tetradecylamine, hexadecylamine, and octadecylamine are members of the class. High molal primary amines, like those sold by Armour & Company, Chicago, as "Armeens," usually with a figure designation showing the numbers of C atoms in the alkyl radical, e. g., "Armeen 10," "Armeen 12," "Armeen 16," etc., are included. So are secondary amines like diethylamine, dipropylamine, dibutylamine, diamylamine, dihexylamine, dioctylamine, etc. Also included are aniline, cyclohexylamine, bis-(dimethylbutyl)-amine, 1-3-dimethylbutylamine, 2-amyl-4-methyl pentane. Amides are also included in this class, but are commonly not attractive for use here because of the difficulty of securing satisfactory reaction to produce secondary amides. Other useful amines of this class will be suggested by the above-recited list.

*Class 2.*—Compounds containing only 1 nitrogen atom per molecule, but in which a hydroxyl group is the only reactive and functional group, as here employed. In this class are tertiary alkanolamines like diethylethanolamine, dimethylethanolamine, triethanolamine, diethylpropanolamine, methyldiethanolamine, ethyldipropanolamine, phenyldiethanolamine, etc. The products obtained by reacting such amines with alkylene oxides like ethylene oxide or propylene oxide are also useful, e. g., triethanolamine may be reacted with ethylene or propylene oxide. Alkyl primary amines, particularly those in which the alkyl group originates in fatty materials and contains from about 10 to about 18 carbon atoms, may be treated with such alkylene oxides to produce useful nitrogen compounds of the generic formula

R—di(Alkoxy)$_n$H—N

Similarly, amides of the generic formula RCONH$_2$, may be oxyalkylated to produce compounds of the generic formula

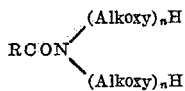

$$RCON \begin{cases} (Alkoxy)_nH \\ (Alkoxy)_nH \end{cases}$$

The ricinoleyl amides of dialkylamines are also examples of this class. Other examples of similarly useful reactants of this class will be suggested by the above list.

*Class 3.*—Compounds containing only 1 nitrogen atom per molecule and having, in addition to at least 1 reactive hydrogen atom attached thereto, also at least 1 reactive hydroxyl group. In this class are included monoethanolamine, diethanolamine, monopropanolamine, dipropanolamine, ethylethanolamine, propylethanolamine, ethylpropanolamine, phenylethanolamine, 2-amino-2-methyl-1-propanol, 4-amino-4-methyl-2-pentanol, 4-amino-2-butanol, 1-dimethylamino-2-propanol, 5-isopropylamino-1-pentanol, etc. The high-molal monocarboxy acid amides of monalkanolamines are also examples of this class. Obvious equivalents will be suggested by the above list.

*Class 4.*—Esters of tertiary alkanolamines having only 1 nitrogen atom per molecule, to which nitrogen atom there are attached no reactive hydrogen atoms, but in which ester molecule there is at least 1 reactive hydroxyl radical, either attached to the nitrogen atom through a suitable divalent radical or else as a part of the acyl radical present in said ester. The acyl radicals are those found in monocarboxy acids having 8 C atoms or more. Examples of this class of nitrogen compounds are the esters produced from oleic acid and ethyldiethanolamine or from ricinoleic acid and diethylethanolamine. In the case of the above oleic esters, esterification consumes only one of the two hydroxyl groups originally present in that alkanolamine, leaving one such reactive hydroxyl group in the ester, for use for the present purpose. In the case of the ricinoleic ester above, esterification consumes the only hydroxyl group originally present in the alkanolamine used; but the ricinoleic radical itself contains a reactive hydroxyl group, and the ester is therefore still reactive for the present purpose. In preparing the compounds of this kind, there may be employed only as many acyl radicals as there are alkanol radicals, less one; except that, if the acyl radical itself retains at least one reactive hydroxyl group after esterification, then one may use as many acyl radicals as there are alkanol radicals. Examples of suitable alkanolamines have already been recited under Class 2 above; but some of the examples there recited will not serve here in all cases because they contain only one reactive hydroxyl group and this is destroyed in esterification. If ricinoleic acid is the acylating reactant, all those recited there are useful here. It is apparent from the foregoing description that the intent is to retain at least one reactive hydroxyl group in the ester prepared from the tertiary alkanolamine and the acylating reactant employed.

*Class 5.*—Compounds which are non-resinous, which contain more than 1 nitrogen atom per molecule, and which contain no acyl group. Examples include the alkylene polyamines like ethylenediamine, diethylenetriamine, triethylene-tetramine, tetraethylenepentamine, propylenediamine, dipropylenetriamine, etc. These alkylene polyamines may be treated with an alkylene oxide like ethylene oxide or propylene oxide to produce derivatives which are also useful here, such as hydroxyethylethylenediamine, tetraethanoltetraethylenepentamine, etc. Oxyalkylation may be continued, of course, until a considerable number of alkyleneoxy groups have been introduced, without adversely affecting the utility of such derivatives here. Imidazolines, both monoimidazolines and di-imidazolines, are included in this present class. Such compounds may be prepared by reacting, under sufficiently severe conditions, a monocarboxylated acid and an alkylenepolyamine. For example, when oleic acid and tetraethylenepentamine are reacted in molar proportions at a temperature somewhat exceeding 200° C. amidification first occurs, with the elimination of 1 mole of water. On continued heating, especially at temperatures approaching 300° C. a second molecule of water is split out, the acyl group becomes an alkyl group, the imidazoline ring is formed, and the product is the monooleyl imidazoline of tetraethylenepentamine. If the proportion of fatty acid is doubled, a dioleyl imidazoline is produced, instead. Examples of such mono- and di-imidazolines are recited and described in U. S. Patents Nos. 2,466,517 and 2,468,163, dated April 5, 1949, and April 26, 1949, respectively, to Blair and Gross. Furthermore, U. S. Patent No. 2,369,818, dated February 20, 1945, to De Groote and Keiser, illustrates the fact that such imidazolines may be subjected to reaction with an alkylene oxide like ethylene oxide, to produce oxyalkylated derivatives thereof which are useful here.

Other examples of suitable reactants of the present class include 3-diethylaminopropylamine, 1-3-diaminobutane, triglycoldiamine, and the compound,

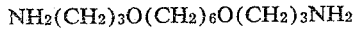

NH$_2$(CH$_2$)$_3$O(CH$_2$)$_6$O(CH$_2$)$_3$NH$_2$

See U. S. Patent No. 2,552,530, dated May 15, 1951, for additional examples of suitable nitrogen compounds of this class.

*Class 6.*—Compounds containing more than 1 basic nitrogen atom per molecule, and which also contain at least one high molal acyl group. The amides produced from monocarboxy acids like the fatty acids and alkylene polyamines like tetraethylenepentamine, and referred to in Class 5 above as being intermediates formed in the preparation of certain imidazolines, are representative of this class. For example, if one reacts 1 mole of oleic acid with 1 mole of tetraethylenepentamine until 1 mole of water of reaction is removed, the product is an amide of the present class. Stearic acid or tall oil or other detergent-forming acid having at least 8 C atoms may be substituted for oleic acid in producing such an amide, with equally satisfactory results. Other alkylene polyamines such as ethylenediamine, diethylenetriamine, triethylenetetramine, etc., may be substituted for tetraethylenepentamine in the examples just discussed, to produce desirable amides. Or such polyamine may be oxyalkylated prior to use in the amidification reaction, using ethylene oxide or propylene oxide. If imidazolines of the kind included in Class 5, immediately above, are acylated, such acylated imidazolines are then properly included in the present class of nitrogen compounds. Other useful examples of nitrogen compounds of the present class are described in U. S. Patent No. 2,243,329, dated May 27, 1940, to De Groote and Blair.

Of all the members of this sixth class of nitrogen compounds, we prefer to employ as reactants here a type of product which is related to the esters of Class 4 above. If, instead of using molal proportions of high molal monocarboxy acid having 8 carbon atoms or more and of tertiary alkanolamine, as in the preparation of materials of Class 4, above, one employs 2 or more moles of alkanolamine for every mole of monocarboxy acid, desirable reactants of the present class are formed. These may be termed acylated polyaminoalcohols. To describe more precisely this particular and preferred type of Class 6 nitrogen compound, the following statement is made.

The compounds are acylated derivatives of a basic polyaminoalcohol of the formula:

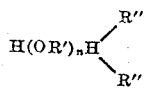

said acylated derivatives thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; and RCO is a substituent for a hydroxyl hydrogen atom.

In the foregoing formula, R' may, in some of its multiple occurrences in the molecule, represent the same alkylene radical or it may represent different alkylene radicals, so long as each R contains from 2 to 10 carbon atoms. For example, oxyethylated, oxypropylated triethanolamine would contain some R' radicals which are $C_2H_4$ radicals, and others which are $C_3H_7$ radicals.

Further description of the acylated polyaminoalcohol reactant will be found, for example, in U. S. Patent No. 2,470,829, dated May 24, 1949, to Monson.

It is to be understood that isomeric forms of the nitrogenous compounds of all 6 classes above may be employed instead of the forms referred to above, without departing from the invention.

Other amines, some of which are predominantly hydrophile and some of which are predominantly hydrophobe, also may be employed. Reference is made to previously mentioned U. S. Patents Nos. 2,181,929, 2,330,222, 2,356,565, 2,396,097 and 2,552,530. Examples of hydrophile amines include glucamine and maltosamine.

Particular reference is made to aforementioned U. S. Patent No. 2,552,530, for the reason that it illustrates suitable amines in which the molecular weight may be as high as 4,000 to 10,000. Other amines may be obtained in a comparable fashion from monoamines as raw materials instead of polyamines as for example, from triethanolamine. Similarly, types of materials can be obtained which are extremely hydrophile by oxyalkylation in the same manner using ethylene oxide or glycide. Generally speaking, however, it is our preference that the nitrogen-containing reactant has a molecular weight of less than 3,000 and generally less than 1,800.

PART 3

As has been pointed out previously, the reactions involved are essentially oxyalkylation reactions involving a nitrogen-containing compound (non-resinous) having at least one labile hydrogen atom.

If one employs a compound such as methylamine ammonia, which is a gas, the oxyalkylation procedure can be conducted in equipment of the kind which has been described for oxyalkylation, except that the procedure is reversed in that the diglycidyl ether as such is dissolved in inert solvent with or without an added catalyst, such as 1% of sodium methylate, and is reacted by slowly passing in the reactive nitrogen-containing reactant, to wit, methylamine. However, the most important phase of the instant invention is concerned with organic nitrogen derivatives which are invariably solids or liquids as distinguished from gases. Therefore, the reaction with the oxyalkylating agent, i. e., the diglycidyl ether or, in any event, the polyepoxide reactant as described, is conducted in an ordinary reaction vessel which need not have the usual modifications necessary when a gas, such as ethylene oxide, is used. Indeed, the reactions can be conducted readily in glass laboratory equipment such as the kind used for resin manufacture as described in a number of patents, as, for example, aforementioned U. S. Patent No. 2,499,365. All that is necessary is to put the reactants together and note whether the reaction goes without the presence of a catalyst. Generally speaking, if there is a basic nitrogen atom present reaction will take place. If the reaction does not take place, or takes place too slowly, then one need only repeat the experiment using a small amount of catalyst, for instance, about one, two or 3 percent of sodium methylate, or finely divided caustic soda. Any of the usual oxyalkylation catalysts can be employed. For obvious reasons, a basic catalyst is most desirable.

If the reaction proceeds too rapidly and an insoluble rubbery mass is obtained, the best procedure is simply to repeat the preparation with greater care and stop just short of the incipient gelation point and then determine if the reaction has gone to completion, or substantially so. In some instances when a reactant yields rubbery masses rather readily and there is no other objection to so doing, one is well advised to react the nitrogenous reactant with one or more moles of ethylene oxide and then use the oxyethylated derivative instead of the initial nitrogen-containing compound. As is also known, gelation often can be prevented by introducing some other group, such as a cyclohexyl group, a phenyl group, or a long-chain aliphatic group at a point where possibly there are two reactive groups immediately adjacent, as in the case of the primary amine. Actually, the choice of reactants is so wide and so diverse that this probably presents no real or additional difficulty in the overwhelming majority of cases.

For purpose of convenience, the following examples are included in tabular form in Table I. In these examples two reactants have been used, to wit, diepoxide A (or diglycidyl ether A) and diepoxide B (or diglycidyl ether B) as described in Part 2, preceding. In the following table the ratio was two parts of the amine compound and one part of the diepoxide. Under other circumstances other ratios can be used as indicated elsewhere.

TABLE I

| Ex. No. | Reactants | Catalyst (NaOCH₃) | Time of reaction (hrs.) | Max. temp., °C. | Color and physical state | Solubility in— | | |
|---|---|---|---|---|---|---|---|---|
| | | | | | | Water | 5% HOAC | Xylene |
| 1 | Diphenylamine, 84.6 g., +A, 92.5 g | No | 2 | 190 | Dark liquid | Partially dispersible. | Dispersible | Soluble. |
| 2 | Benzylamine, 53.6 g., +A, 92.5 g | No | 2 | 185 | Yellow semisolid | Dispersible | Soluble | Partially soluble. |
| 3 | Armeen 8-D, 133 g., +A, 185 g | No | 1.5 | 190 | Lt. brown semisolid | ___do___ | ___do___ | Do. |
| 4 | Armeen 10-D, 185 g., +A, 185 g | No | 1.5 | 190 | ___do___ | ___do___ | ___do___ | Do. |
| 5 | Armeen 12-D, 104 g., +A, 92.5 g | No | 1.5 | 190 | Red semisolid | ___do___ | ___do___ | Do. |
| 6 | Armeen 14-D, 110 g., +A, 92.5 g | No | 1.5 | 195 | Brown semisolid | ___do___ | ___do___ | Do. |
| 7 | Armeen 16-D, 126 g., +A, 92.5 g | No | 1.5 | 192 | ___do___ | Insoluble | Dispersible | Do. |
| 8 | Armeen 18-D, 138 g., +A, 92.5 g | No | 1 | 200 | Lt. brown waxy solid | ___do___ | ___do___ | Do. |
| 9 | Primene 81-T, 108.5 g., +A, 92.5 g | No | 2.5 | 155 | Dk. brown semisolid | ___do___ | ___do___ | Do. |
| 10 | Primene JM-T, 172 g., +A, 92.5 g | No | 2 | 200 | Red brown semisolid | ___do___ | ___do___ | Do. |
| 11 | Rosin amine D, 157.5 g., +A, 92.5 g | No | 1.5 | 190 | Red brittle solid | ___do___ | Soluble (Diff.) | Do. |
| 12 | Duomeen 12, 151.5, +A, 92.5 g | No | 2 | 175 | Dk. brown semisolid | Dispersible | Soluble | Do |
| 13 | Duomeen C, 160.5 g., +A, 92.5 g | No | 2 | 170 | Dark semisolid | ___do___ | ___do___ | Do. |
| 14 | Duomeen S, 201 g., +A, 92.5 g | No | 2 | 160 | Brown semisolid | ___do___ | Dispersible | Do. |
| 15 | Duomeen T, 200 g., +A, 92.5 g | No | 2 | 150 | Lt. brown semisolid | ___do___ | ___do___ | Do. |
| 16 | Armid 10, 87.5 g., +A, 92.5 g | 1.8 | 2 | 210 | Green gray solid | Partially dispersible. | Partially dispersible. | Do. |
| 17 | Armid 14, 68.4 g., +A, 55.5 g | 1.2 | 1 | 250 | Dk. brown solid | ___do___ | ___do___ | Do. |
| 18 | Armid 16, 77.4 g., +A, 55.5 g | 1.3 | 1 | 210 | Brown solid | ___do___ | ___do___ | Dispersible. |
| 19 | Armid HT, 82.8 g., +A, 55.5 g | 1.4 | 1 | 210 | ___do___ | ___do___ | ___do___ | Soluble. |
| 20 | Ethomeen C/20, 64.6 g., +A, 18.5 g | No | 1.5 | 200 | Thick amber liquid | Soluble | Soluble | Do. |
| 21 | Ethomeen C/25, 86.6 g., +A, 18.5 g | No | 1.5 | 185 | ___do___ | ___do___ | ___do___ | Do. |
| 22 | Ethomeen 18/20, 71.6 g., +A, 18.5 g | No | 1.5 | 210 | ___do___ | ___do___ | ___do___ | Do. |
| 23 | Ethomeen 18/25, 89.5 g., +A, 17.7 g | No | 1.5 | 190 | ___do___ | ___do___ | ___do___ | Do. |
| 24 | Ethomid HT/15, 79.6 g., +A, 29.6 g | 1.1 | 4 | 230 | Soft yellow solid | Partially dispersible. | Dispersible | Do. |
| 25 | Ethomid HT/25, 75 g., +A, 14.8 g | 0.9 | 4 | 220 | Soft brown solid | Soluble | Soluble | Do. |
| 26 | Ethomid HT/60, 74.4 g., +A, 5.6 g | 0.8 | 4 | 265 | ___do___ | ___do___ | ___do___ | Do. |
| 27 | Ethomid RO/25, 75.4 g., +A, 14.8 g | 0.9 | 4 | 220 | Brown semisolid | ___do___ | ___do___ | Do. |
| 28 | Furfurylamine+propylene oxide 1:17.9, 113.5 g., +A, 18.5 g. | No | 2 | 195 | Dark brown liquid | Dispersible | ___do___ | Do. |
| 29 | Furfurylamine+propylene oxide 1:30.5, 186 g., +A, 18.5 g. | No | 2 | 200 | ___do___ | ___do___ | ___do___ | Do. |
| 30 | Furfurylamine+propylene oxide 1:51.8, 155 g., +A, 9.5 g. | No | 2 | 190 | ___do___ | ___do___ | ___do___ | Do. |
| 31 | Triethanolamine+propylene oxide 1:27, 171.5 g., +A, 18.5 g. | No | 3 | 185 | ___do___ | ___do___ | ___do___ | Do. |
| 32 | Triethanolamine+propylene oxide 1:30.2, 190 g., +A, 18.5 g. | No | 3 | 200 | ___do___ | ___do___ | ___do___ | Do. |

TABLE II

| Ex. No. | Reactants | Catalyst (NaOCH₃) | Time of reaction (hrs.) | Max. temp., °C. | Color and physical state | Solubility in— | | |
|---|---|---|---|---|---|---|---|---|
| | | | | | | Water | 5% HOAC | Xylene |
| 1a | Armeen 8D, 133 g., +B, 110 g | No | 1.5 | 195 | Brown semisolid | Dispersible | Soluble | Soluble. |
| 2a | Armeen 12D, 104 g., +B, 55 g | No | 1.5 | 200 | Reddish semisolid | ___do___ | ___do___ | Do. |
| 3a | Armeen 16D, 126 g., +B, 55 g | No | 1.5 | 200 | Brown semisolid | Insoluble | Dispersible | Do. |
| 4a | Armeen 18D, 138 g., +B, 55 g | No | 1.5 | 200 | Brown soft solid | ___do___ | ___do___ | Do. |
| 5a | Primene 81-T, 108.5 g., +B, 55 g | No | 2 | 180 | Dark brown semisolid | ___do___ | ___do___ | Do. |
| 6a | Primene JM-T, 172 g., +B, 55 g | No | 2 | 200 | Reddish brown semisolid. | ___do___ | ___do___ | Do. |
| 7a | Rosin amine D, 157.5 g., +B, 55 g | No | 2 | 195 | Reddish solid | ___do___ | Soluble | Do. |
| 8a | Duomeen 12, 151.5, +B, 55 g | No | 2 | 185 | Dk. brown semisolid | Dispersible | ___do___ | Do. |
| 9a | Duomeen C, 160.5 g., +B, 55 g | No | 2 | 180 | Dark semisolid | ___do___ | ___do___ | Do. |
| 10a | Duomeen T, 200 g., +B, 55 g | No | 2 | 175 | Brown semisolid | ___do___ | Dispersible | Do. |
| 11a | Armid 14, 68.4 g., +B, 33 g | 1 | 2 | 200 | Dark brown solid | Partially dispersible. | Partially dispersible. | Do. |
| 12a | Armid 16, 77.4 g., +B, 33 g | 1.1 | 2 | 220 | Brown solid | ___do___ | ___do___ | Do. |
| 13a | Ethomeen C/20, 64.6 g., +B, 11 g | 0.8 | 1 | 200 | Amber liquid | Soluble | Soluble | Do. |
| 14a | Ethomeen 18/20, 71.6 g., +B, 11 g | 0.8 | 1 | 210 | ___do___ | ___do___ | ___do___ | Do. |
| 15a | Ethomid HT/15, 79.6 g., +B, 17.6 g | 1 | 2.5 | 220 | Yellow solid | Partially dispersible. | Dispersible | Do. |
| 16a | Ethomid RO/25, 75.4 g., +B, 8.8 g | 0.9 | 2 | 210 | Brown semisolid | Soluble | Soluble | Do. |
| 17a | Furfurylamine+propylene oxide 1:17.9, 113.5 g., +B, 11 g. | No | 2 | 190 | Dark brown liquid | Dispersible | ___do___ | Do. |
| 18a | Furfurylamine+propylene oxide 1:51.8, 155 g., +B, 5.5 g. | No | 2 | 200 | ___do___ | ___do___ | ___do___ | Do. |
| 19a | Triethanolamine+propylene oxide 1:27, 171.5 g., +B, 11 g. | No | 2.5 | 200 | ___do___ | ___do___ | ___do___ | Do. |
| 20a | Triethanolamine+propylene oxide 1:30.2, 190 g., +B, 11 g. | No | 3 | 210 | Brown liquid | ___do___ | ___do___ | Do. |

As has been pointed out previously, high molal amines, molal diamines of certain types and certain other products are commonly sold and identified by certain trade names simply as a matter of convenience. In the previous tables such commonly used identifications have been employed. In some instances evidently the same product is now, or shortly will be, available from more than one source. For this reason the following tables give more specific information as to certain of these products which are referred to in the table, and other similar products which are equally effective and may be used to comparable advantage.

As to the high molecular weight aliphatic primary amines described as Armeens, their composition is shown by the following table:

TABLE III

| n-Primary amine | Carbon chain length | Armeen 8 | Armeen 8D | Armeen 10D | Armeen 12 | Armeen 12D | Armeen 14D | Armeen 16 | Armeen 16D | Armeen 18 | Armeen 18D |
|---|---|---|---|---|---|---|---|---|---|---|---|
| Hexyl | 6 | 3 | 3 | | | | | | | | |
| Octyl | 8 | 90 | 90 | 3 | | | | | | | |
| Decyl | 10 | 7 | 7 | 90 | | | | | | | |
| Dodecyl | 12 | | | 7 | 90 | 90 | 4 | | | | |
| Tetradecyl | 14 | | | | 9 | 9 | 90 | | | | |

TABLE III—Continued

| n-Primary amine | Carbon chain length | Armeen 8 | Armeen 8D | Armeen 10D | Armeen 12 | Armeen 12D | Armeen 14D | Armeen 16 | Armeen 16D | Armeen 18 | Armeen 18D |
|---|---|---|---|---|---|---|---|---|---|---|---|
| Hexadecyl | 16 | | | | | | 4 | 90 | 90 | 6 | 6 |
| Octadecyl | 18 | | | | | | | 6 | 6 | 93 | 93 |
| Octadecenyl | 18 | | | | 1 | 1 | 2 | 4 | 4 | 1 | 1 |
| Octadecadienyl | 18 | | | | | | | | | | |
| Mean molecular weight of primary amine content | | 129 | 129 | 157 | 185 | 185 | 213 | 244 | 244 | 267 | 267 |
| Mol combining weight percent primary | | 152 | 133 | 162 | 218 | 191 | 220 | 287 | 252 | 314 | 276 |
| Percent primary amine by titration | | 85 | 97 | 97 | 85 | 97 | 97 | 85 | 97 | 85 | 97 |
| Approx. melting point, °C | | −13 | −13 | 8 | 24 | 24 | 29 | 38 | 38 | 55 | 55 |

The Duomeens are fatty diamines of this general formula:

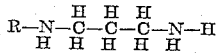

The "R" represents an alkyl group derived from a fatty acid, identification of which is as follows:

Duomeen 12—lauric    Duomeen S—soya
Duomeen C—coconut    Duomeen T—tallow

The Armids are, as stated, high molecular weight aliphatic amides whose composition is shown in the following table:

TABLE IV

| m-Primary amides | Carbon chain length | Armid 10 | Armid 14 | Armid 16 | Armid HT |
|---|---|---|---|---|---|
| Hexane | 6 | | | | |
| Octane | 8 | 3 | | | |
| Decane | 10 | 90 | | | |
| Dodecane | 12 | 7 | 4 | | |
| Tetradecane | 14 | | 90 | | |
| Hexadecane | 16 | | 4 | 90 | 25 |
| Octadecane | 18 | | | 6 | 70 |
| Octadecene | 18 | | 2 | 4 | 5 |
| Octadecadiene | 18 | | | | |
| Substituted cyclic | 20 | | | | |
| Approx. melting point, °C | | 97 | 97 | 97 | 98 |

As stated in the pamphlet distributed by Armour Chemical Division, Armour and Company, Chicago, Illinois, and entitled "Ethomeens . . . Ethomids . . . Ethofats," the Ethomeens are essentially oxyalkylated fatty primary amines of the type characterized by the Armeens previously described. If desired, any one of the previous Armeens can be treated with one to give times its weight of ethylene oxide and thus obtain a series of compounds which will serve in the same manner as the Ethomeens employed in the examples of Table I.

The Ethomids are products obtained similarly from the high molal fatty primary amides such as the Armids previously described. These amides can be treated with ethylene oxide in the same weight ratio as above and obtain a series of compounds which are just as suitable for the reaction process as the Ethomeens described above. For further information on the Ethomids see the circular referred to previously in regard to the Ethomeens.

Rosin Amine D is the commercial amine obtained from rosin in the same manner that primary amines are obtained from higher fatty acids. It is a viscous liquid containing approximately 90% or more amine. Its color is pale yellow, it has a nitrogen content of 4.3 to 4.5 and a neutralization value of 312 to 322. It is furnished by at least one company, to wit, the Hercules Powder Company.

Previous reference has been made to the use of oxyethylated high molal weight fatty amides. Equally satisfactory are the products derived from Rosin Amine D. This is sold by the Hercules Powder Company under the designation "Hercules Polyethanol Rosin Amine D." Typical examples are the following:

| Polyethanol rosin amine D products | Neutralization equivalent | Percent nitrogen |
|---|---|---|
| 0200 | 402 | 3.50 |
| 0500 | 508 | 2.72 |
| 0515 | 494 | 2.82 |
| 1100 | 794 | 1.73 |
| 1110 | 690 | 2.00 |
| 1700 | 1,055 | 1.28 |
| 2000 | 1,180 | 1.21 |
| 3100 | 1,666 | 0.87 |

Since the neutralization equivalent and percent nitrogen is well known for Rosin Amine D the amount of ethylene oxide can readily be calculated.

The Primenes are products manufactured by Rohm and Haas, Philadelphia, Pennsylvania, and the designation is used to indicate amines in which the alkyl group has tertiary alkyl structure. Thus, the formula may be designed as R-NH₂. In Primene 81T, R is a mixture of isomers having 12 to 15 carbon atoms with tertiary alkyl structure as indicated. JM-T is a similar product where R represents a mixture of isomers having 18 to 24 carbon atoms.

PART 4

The preparation of the compounds or products described in Part 3, preceding, involves an oxyalkylating agent, to wit, a polyepoxide and usually a diepoxide. The procedure described in the present part is a further oxyalkylation step but involves the use of a monoepoxide or the equivalent. The principal difference is only that while polyepoxides are invariably nonvolatile and can be reacted under a condenser, at least numerous monoepoxides and particularly ethylene oxide, propylene oxide, butylene oxide, etc., involve somewhat different operating conditions. Glycide and methylglycide react under practically the same conditions as the polyepoxides. Actually, for purpose of convenience, it is most desirable to conduct the previous reaction, i. e., the one involving the polyepoxide, in equipment such that subsequent reaction with monoepoxides may follow without interruption.

We have found it particularly advantageous to use laboratory equipment which permits continuous oxypropylation and oxyethylation. The oxyethylation step is, of course, the same as the oxypropylation step insofar that low boiling liquids are handled in each instance. The monoepoxide oxyalkylation step is carried out in a manner which is substantially conventional for the oxyalkylation of compounds having a labile hydrogen atoms, and for that reason a detailed description of the procedure is omitted and the process will simply be illustrated by the subsequent examples.

The amount of monoepoxide employed may be as high as 50 parts of monoepoxide for one part of diepoxide-derived compound obtained as described in Part 4, preceding.

Attention is directed to the fact that in the series of subsequent examples the initial series are indicated by J. The reason is for convenience of comparison with a similar series also indicated by J in our companion application, Serial No. 376,763, filed August 26, 1953.

*Example J1*

The polyepoxide-derived oxyalkylation-susceptible compound employed is the one previously designed and described as Example 5 in Table I. As is shown by Table I this was obtained by reacting Armeen 12D with Diepoxide A, Armeen 12D is described in detail in the previous text.

For purpose of convenience, reference herein and in the tables to the oxyalkylation-susceptible compound will be abbreviated in the table heading as "OSC"; reference is to the solvent-free material since, for convenience, the amount of solvent is noted in a second column. Actually, part of the solvent may have been present and in practically every case was present in either the resinification process or the condensation process, or in treatment with a polyepoxide. In any event, the amount of solvent present at the time of treatment with a monoepoxide is indicated as a separate item. To be consistent, of course, the oxyalkylation-susceptible compound abbreviated as "OSC" is indicated on a solvent-free basis.

7.4 pounds of the polyepoxide-amine reaction product were mixed with 7.6 pounds of solvent (xylene in this series) along with ½ pound of finely powdered caustic soda as a catalyst. This reaction mixture was treated with 7.4 pounds of ethylene oxide. At the end of the reaction period the molal ratio of oxide to initial compound was approximately 16.8 to one and the theoretical molecular weight was approximately 1480.

Adjustment was made in the autoclave to operate at a temperature of 125° to 130° C., and at a pressure of 10 to 15 pounds per square inch.

The time regulator was set so as to inject the ethylene oxide in approximately one-half hour and then continued stirring for one-half hour longer simply as a precaution to insure complete reaction. The reaction went readily and, as a matter of fact, the ethylene oxide could have been injected in probably 15 minutes instead of a half-hour and the subsequent time allowed to insure completion of reaction may have been entirely unnecessary. The speed of reaction, particularly at the low pressure, undoubtedly was due in a large measure to the excellent agitation and also to the comparatively high concentration of catalyst.

A comparatively small sample, less than 50 grams, was withdrawn merely for examination as far as solubility or emulsifying power was concerned, and also for the purpose of making some tests on various oil field emulsions. The amount withdrawn was so small that no cognizance of this fact is included in the data or subsequent data, or in data reported in tabular form in subsequent Tables V, VI, and VII.

The size of the autoclaves employed varied from 15 to 35 gallons. In innumerable oxyalkylations we have withdrawn a substantial portion at the end of each step and continued oxyalkylation on a partial residual sample. This was not the case in this particular series. Certain examples were duplicated as hereinafter noted and subjected to oxyalkylation with a different oxide.

Example J2

This example simply illustrates further oxyalkylation of Example J1, preceding. The oxyalkylation-susceptible compound, to wit, Example 5, is the same one as was used in Example J1, preceding, because it is merely a continuation. In the subsequent tables, such as Table V, the oxyalkylation-susceptible compound in the horizontal line concerned with Example J2 refers to oxyalkylation-susceptible compound, Example 5. Actually, one could refer just as properly to Example J1 at this stage. It is immaterial which designation is used so long as it is understood and such practice is used consistently throughout the tables. In any event, the amount of ethylene oxide is the same as before, to wit, 7.4 pounds. This means the amount of oxide at the end was 14.8 pounds. It is meant that the ratio of oxide to oxyalkylation-susceptible compound (molar basis) at the end was 33.6 to 1. The theoretical molecular weight was about 2,200. There was no added solvent. In other words, it remained the same, that is, 7.6 pounds, and there was no added catalyst. The entire procedure was substantially the same as in Example J1, preceding.

In all succeeding examples the temperature and pressure were the same as previously, to wit, 125° to 130° C., and the pressure 10 to 15 pounds. The time element was about one hour, the same as before.

Example J3

The oxyethylation proceeded in the same manner as described in Examples J1 and J2. There was no added solvent and no added catalyst. The oxide added was 3.7 pounds. The total oxide at the end of the oxyalkylation procedure was 18.5 pounds. The molal ratio of oxide to condensate was 43 to 1. The theoretical molecular weight was approximately 2,600. As previously noted, conditions in regard to temperature and pressure were the same as in Examples J1 and J2. The time period also was the same, to wit, ¾ hour.

Example J4

The oxyethylation was continued and the amount of oxide added was the same as before, to wit, 3.7 pounds. The amount of oxide added at the end of the reaction was 22.2 pounds. There was no added solvent and no added catalyst. Conditions as far as temperature and pressure are concerned were the same as in previous examples. The time period was the same as before, to wit, 45 minutes. The reaction at this point showed modest, if any, tendency to slow up. The molal ratio of oxide to oxyalkylation-susceptible compound was about 50.4 to 1, and the theoretical molecular weight was 2,960.

Example J5

The oxyalkylation was continued with the introduction of another 3.7 pounds of oxide. No added solvent was introduced, and likewise no added catalyst was introduced. The theoretical molecular weight at the end of the reaction was approximately 3,330. The molal ratio of oxide to oxyalkylation-susceptible compound was 58.8 to 1. The time period was one hour. The total amount of oxide added was 25.9 pounds.

Example J6

The same procedure was followed as in the previous examples without addition of either more catalyst or more solvent. The amount of oxide added was the same as before, to wit, 3.7 pounds. The time required to complete the reaction was 1¼ hours. The total amount of oxide added was 29.6 pounds. At the end of the reaction the ratio of oxide to oxyalkylation-susceptible compound was approximately 67.2 to 1, and the theoretical molecular weight was about 3,700.

The same procedure as described in the previous examples was employed in connection with a number of the other condensations described previously. All these data have been presented in tabular form in Tables V through VII, inclusive.

In almost every case a 35-gallon autoclave was employed, although in some instances the initial oxyethylation was started in a 15-gallon autoclave and then transferred to a 35-gallon autoclave. This is immaterial but happened to be a matter of convenience only. The solvent used in all cases was xylene. The catalyst used was finely powdered caustic soda.

Referring now to Tables V, VI and VII, it will be noted that compounds J1 through J18 were obtained by the use of ethylene oxide, whereas Examples J19 through J36 were obtained by the use of propylene oxide; and Examples J37 through J54 were obtained by the use of butylene oxide.

Referring now to Table VI specifically, it will be noted that the series of examples beginning with K1 were obtained, in turn, by use of both ethylene and propylene oxides, using ethylene first; in fact, using Example J6 as the oxyalkylation-susceptible compound in the first six examples. This applies to series K1 through K18.

Similarly, series K19 through K36 involve the use of both propylene oxide and ethylene oxide in which the propylene oxide was used first, to wit, K17 was prepared from J24, a compound which was initially derived by use of propylene oxide.

Similarly, Examples K37 through K54 involve the use of ethylene oxide and butylene oxide, the ethylene oxide being used first. Also, these two oxides were used in the series K55 through K72, but in this latter instance the butylene oxide was used first and then the ethylene oxide.

Series K73 through K90 involve the use of propylene oxide and butylene oxide, butylene oxide being used first and propylene oxide being used next.

In series L1 through L18 the three oxides were used. It will be noted in Example L1 the initial compound was K78; Example K78, in turn, was obtained from a compound in which butylene oxide was used initially and then propylene oxide. Thus, the oxide added in the series L1 through L6 was by use of ethylene oxide as indicated in Table VII.

Referring to Table VII, in regard to Example L19 it will be noted again that the three oxides were used and L19 was obtained from K58. Example K58, in turn, was obtained by using butylene oxide first and then ethylene oxide. In Example L19 and subsequent examples, such as L20, L21, etc., propylene oxide was added.

Tables VII, IX and X give the data in regard to the oxyalkylation procedure as far as temperature and pressure are concerned and also give some data as to solubility of the oxyalkylated derivative in water, xylene and kerosene.

Referring to Table V in greater detail, the data are as follows: The first column gives the example numbers, such as J1, J2, J3, etc. etc.; the second column gives the oxyalkylation-susceptible compound employed which, as previously noted in the series J1 through J6, is Example 5 in Table I, although it would be just as proper to say that in the case of J2 the oxyalkylation-susceptible compound was J1, and in the case of J3 the oxyalkylation-susceptible compound was J2. Actually reference is to the parent derivative for the reason that the figure stands constant and probably leads to a more convenient presentation. Thus, the third column indicates the polyepoxide-derived condensate previously referred to in the text.

The fourth column shows the amount of ethylene oxide in the mixture prior to the particular oxyethylation step. In the case of Example J1 there is no oxide used but it appears, of course, in J2, J3 and J4, etc.

The fifth column can be ignored for the reason that it is concerned with propylene oxide only, and the sixth column can be ignored for the reason that it is concerned with butylene oxide only.

The seventh column shows the catalyst which is invariably powdered caustic soda. The quantity used is indicated.

The eighth column shows the amount of solvent which is xylene unless otherwise stated.

The ninth column shows the amount of oxyalkylation-susceptible compound which in this series is the polyepoxide-derived compound.

The tenth column shows the amount of ethylene oxide in at the end of the particular step.

Column eleven shows the same data for propylene oxide, and column twelve for butylene oxide. For obvious reasons these can be ignored in the series J1 through J18.

Column thirteen shows the amount of the catalyst at the end of the oxyalkylation step, and column fourteen shows the amount of solvent at the end of the oxyalkylation step.

The fifteenth, sixteenth and seventeenth columns are concerned with molal ratio of the individual oxides to the oxyalkylation-susceptible compound. Data appears only in column fifteen for the reason, previously noted, that no butylene or propylene oxide was used in the present instance.

The theoretical molecular weight appears at the end of the table which is on the assumption, as previously noted, as to the probable molecular weight of the initial compound, and on the assumption that all oxide added during the period combined. This is susceptible to limitations that have been pointed out elsewhere, particularly in the patent literature.

Reference now to the second series of compounds in Table V, to wit, Examples J19 through J36, the situation is the same except that it is obvious the oxyalkylating agent used was propylene oxide and not ethylene oxide. Thus, the fourth column becomes a blank and the tenth column becomes a blank and the fifteenth column becomes a blank, but column five, which previously was a blank in Table V now carries data as to the amount of propylene oxide present at the beginning of the reaction. Column eleven carries data as to the amount of propylene oxide present at the end of the reaction, and column sixteen carries data as to the ratio of propylene oxide to the oxyalkylation-susceptible compound. In all other instances the various headings have the same significance as previously.

Similarly, referring to Examples J37 through J54 in Table V, columns four and five are blanks, columns ten and eleven are blanks, and columns fifteen and sixteen are blanks, but data appear in column six as to butylene oxide present before the particular oxyalkylation step. Column twelve gives the amount of butylene oxide present at the end of the step, and column seventeen gives the ratio of butylene oxide to oxyalkylation-susceptible compound.

Table VI is in essence the data presented in exactly the same way except the two oxides appear, to wit, ethylene oxide and propylene oxide. This means that there are only three columns in which data does not appear, all three being concerned with the use of butylene oxide. Furthermore, it shows which oxide was used first by the very fact that reference to Example K1, in turn, refers to J6, and also shows that ethylene oxide was present at the very first stage. Furthermore, for ease of comparison and also to be consistent, the data under Molal Ratio in regard to ethylene oxide and propylene oxide goes back to the original diepoxide-derived amine compound Example 5 in Table I. This is obvious, of course, because the figures 67.2 and 25.5 coincide with the figures for J1 derived from Example 5 in Table I.

In Table VI the same situation is involved except, of course, propylene oxide is used first and this, again, is perfectly apparent. Three columns only are blank, to wit, the three referring to butylene oxide. The same situation applies in examples such as K37 and subsequent examples where the two oxides used are ethylene oxide and butylene oxide, and the table makes it plain that ethylene oxide was used first. Inversely, Example K55 and subsequent examples show the use of the same two oxides but with butylene oxide being used first as shown on the table.

Example K73 and subsequent examples relate to the use of propylene oxide and butylene oxide. Examples beginning with L1, Table VII, particularly L2, L3, etc., show the use of all three oxides so there are no blanks as in the first step of each stage where one oxide is missing. It is not believed any further explanation need be offered in regard to Table VII.

As previously pointed out certain initial runs using one oxide only, or in some instances two oxides, had to be duplicated when used as intermediates subsequently for further reaction. It would be confusing to refer in too much detail in these various tables for the reason that all pertinent data appear and the tables are essentially self-explanatory.

Reference to solvent and amount of alkali at any point takes into consideration the solvent from the previous step and the alkali left from this step. As previously pointed out, Tables VII, IX and X give operating data in connection with the entire series, comparable to what has been said in regard to Examples J1 through J6.

The products resulting from these procedures may contain modest amounts, or have small amounts, of the solvents as indicated by the figures in the tables. If desired, the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides just mentioned, or a combination of both of them.

The same would be true in regard to a mixture of ethylene oxide and butylene oxide, or butylene oxide and propylene oxide.

The colors of the products usually vary from a reddish amber tint to a definitely red amber and to a straw or light straw color. The reason is primarily that no effort is made to obtain colorless resins initially and the resins themselves may be yellow, amber or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color the product. Products can be prepared in which the final color is a lighter amber or straw color with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. Since the products per se are alkaline due to the presence of a basic nitrogen, the removal of the alkaline catalyst is somewhat more difficult than ordinarily is the case for the reason that if one adds hydrochloric acid, for example, to neutralize the alkalinity one may partially neutralize the basic nitrogen radical also. The preferred procedure is to ignore the presence of the alkali unless it is objectionable or else add a stoichiometric amount of concentrated hydrochloric acid equal to the caustic soda present.

TABLE V

| Ex. No. | Composition before | | | | | | | Composition at end | | | | | | Molal ratio | | | Theo. mol. wt. |
|---|---|---|---|---|---|---|---|---|---|---|---|---|---|---|---|---|---|
| | OSC, Ex. No. | OSC, lbs. | Oxides | | | Catalyst, lbs. | Solvent, lbs. | OSC, lbs. | Oxides | | | Catalyst, lbs. | Solvent, lbs. | EtO to oxyalkyl. suscept. compd. | PrO to oxyalkyl. suscept. compd. | BuO to oxyalkyl. suscept. compd. | |
| | | | EtO, lbs. | PrO, lbs. | BuO, lbs. | | | | EtO, lbs. | PrO, lbs. | BuO, lbs. | | | | | | |
| J1 | 5 | 7.4 | | | | 0.50 | 7.6 | 7.4 | 7.4 | | | 0.50 | 7.6 | 16.8 | | | 1,480 |
| J2 | 5 | 7.4 | 7.4 | | | .50 | 7.6 | 7.4 | 14.8 | | | .50 | 7.6 | 33.6 | | | 2,220 |
| J3 | 5 | 7.4 | 14.8 | | | .50 | 7.6 | 7.4 | 18.5 | | | .50 | 7.6 | 42.0 | | | 2,590 |
| J4 | 5 | 7.4 | 18.5 | | | .50 | 7.6 | 7.4 | 22.2 | | | .50 | 7.6 | 50.4 | | | 2,960 |
| J5 | 5 | 7.4 | 22.2 | | | .50 | 7.6 | 7.4 | 25.9 | | | .50 | 7.6 | 58.8 | | | 3,330 |
| J6 | 5 | 7.4 | 25.9 | | | .50 | 7.6 | 7.4 | 29.6 | | | .50 | 7.6 | 67.2 | | | 3,700 |
| J7 | 15 | 11.7 | | | | .75 | 11.8 | 11.7 | 11.70 | | | .75 | 11.8 | 26.6 | | | 2,340 |
| J8 | 15 | 11.7 | 11.7 | | | .75 | 11.8 | 11.7 | 17.55 | | | .75 | 11.8 | 39.9 | | | 2,925 |
| J9 | 15 | 11.7 | 17.55 | | | .75 | 11.8 | 11.7 | 23.4 | | | .75 | 11.8 | 53.2 | | | 3,510 |
| J10 | 15 | 11.7 | 23.4 | | | .75 | 11.8 | 11.7 | 29.25 | | | .75 | 11.8 | 66.5 | | | 4,095 |
| J11 | 15 | 11.7 | 29.25 | | | .75 | 11.8 | 11.7 | 35.10 | | | .75 | 11.8 | 79.8 | | | 4,680 |
| J12 | 15 | 11.7 | 35.1 | | | .75 | 11.8 | 11.7 | 46.8 | | | .75 | 11.8 | 106.4 | | | 5,850 |
| J13 | 20 | 16.62 | | | | 1.0 | 16.38 | 16.62 | 16.5 | | | 1.0 | 16.62 | 37.5 | | | 3,312 |
| J14 | 20 | 16.62 | 16.5 | | | 1.0 | 16.38 | 16.62 | 24.75 | | | 1.0 | 16.62 | 56.25 | | | 4,137 |
| J15 | 20 | 16.62 | 24.75 | | | 1.0 | 16.38 | 16.62 | 33.0 | | | 1.0 | 16.62 | 75.0 | | | 4,962 |
| J16 | 20 | 16.62 | 33.0 | | | 1.0 | 16.38 | 16.62 | 41.25 | | | 1.0 | 16.62 | 93.75 | | | 5,787 |
| J17 | 20 | 16.62 | 41.25 | | | 1.0 | 16.38 | 16.62 | 49.5 | | | 1.0 | 16.62 | 112.5 | | | 6,612 |
| J18 | 20 | 16.62 | 49.5 | | | 1.0 | 16.38 | 16.62 | 66.0 | | | 1.0 | 16.62 | 150.0 | | | 8,260 |
| J19 | 5 | 7.40 | | | | 1.0 | 7.6 | 7.4 | 7.4 | | | 1.0 | 7.6 | | 12.75 | | 1,480 |
| J20 | 5 | 7.40 | | 7.4 | | 1.0 | 7.6 | 7.4 | | 14.8 | | 1.0 | 7.6 | | 25.5 | | 2,220 |
| J21 | 5 | 7.40 | | 14.8 | | 1.0 | 7.6 | 7.4 | | 22.2 | | 1.0 | 7.6 | | 38.25 | | 2,960 |
| J22 | 5 | 7.40 | | 22.2 | | 1.0 | 7.6 | 7.4 | | 29.6 | | 1.0 | 7.6 | | 51.0 | | 3,700 |
| J23 | 5 | 7.40 | | 29.6 | | 1.0 | 7.6 | 7.4 | | 44.4 | | 1.0 | 7.6 | | 76.5 | | 5,180 |
| J24 | 5 | 7.40 | | 44.4 | | 1.0 | 7.6 | 7.4 | | 88.8 | | 1.0 | 7.6 | | 153.0 | | 9,620 |
| J25 | 15 | 11.7 | | | | 1.25 | 11.8 | 11.7 | | 11.7 | | 1.25 | 11.8 | | 20.2 | | 2,340 |
| J26 | 15 | 11.7 | | 11.7 | | 1.25 | 11.8 | 11.7 | | 23.4 | | 1.25 | 11.8 | | 40.4 | | 3,510 |
| J27 | 15 | 11.7 | | 23.4 | | 1.25 | 11.8 | 11.7 | | 35.1 | | 1.25 | 11.8 | | 60.6 | | 4,680 |
| J28 | 15 | 11.7 | | 35.1 | | 1.25 | 11.8 | 11.7 | | 46.8 | | 1.25 | 11.8 | | 80.8 | | 5,850 |
| J29 | 15 | 11.7 | | 46.8 | | 1.25 | 11.8 | 11.7 | | 70.2 | | 1.25 | 11.8 | | 121.2 | | 8,190 |
| J30 | 15 | 11.7 | | 70.2 | | 1.25 | 11.8 | 11.7 | | 93.6 | | 1.25 | 11.8 | | 161.6 | | 10,530 |
| J31 | 20 | 16.62 | | | | 1.5 | 16.38 | 16.62 | | 16.5 | | 1.5 | 16.38 | | 28.44 | | 3,312 |
| J32 | 20 | 16.62 | | 16.5 | | 1.5 | 16.38 | 16.62 | | 33.0 | | 1.5 | 16.38 | | 56.88 | | 4,962 |
| J33 | 20 | 16.62 | | 33.0 | | 1.5 | 16.38 | 16.62 | | 49.5 | | 1.5 | 16.38 | | 85.32 | | 6,612 |
| J34 | 20 | 16.62 | | 49.5 | | 1.5 | 16.38 | 16.62 | | 66.0 | | 1.5 | 16.38 | | 113.76 | | 8,262 |
| J35 | 20 | 16.62 | | 66.0 | | 1.5 | 16.38 | 16.62 | | 99.0 | | 1.5 | 16.38 | | 170.64 | | 11,562 |
| J36 | 20 | 16.62 | | 99.0 | | 1.5 | 16.38 | 16.62 | | 113.5 | | 1.5 | 16.38 | | 199.08 | | 13,212 |
| J37 | 5 | 7.40 | | | | .75 | 7.6 | 7.4 | | | 3.7 | .75 | 7.6 | | | 5.14 | 1,110 |
| J38 | 5 | 7.40 | | | 3.7 | .75 | 7.6 | 7.4 | | | 7.4 | .75 | 7.6 | | | 10.28 | 1,480 |
| J39 | 5 | 7.40 | | | 7.4 | .75 | 7.6 | 7.4 | | | 11.1 | .75 | 7.6 | | | 15.42 | 1,850 |
| J40 | 5 | 7.40 | | | 12.1 | .75 | 7.6 | 7.4 | | | 14.8 | .75 | 7.6 | | | 20.56 | 2,220 |
| J41 | 5 | 7.40 | | | 14.8 | .75 | 7.6 | 7.4 | | | 29.6 | .75 | 7.6 | | | 41.12 | 3,700 |
| J42 | 5 | 7.40 | | | 29.6 | .75 | 7.6 | 7.4 | | | 37.0 | .75 | 7.6 | | | 51.4 | 4,440 |
| J43 | 15 | 11.7 | | | | 1.25 | 11.8 | 11.7 | | | 5.85 | 1.25 | 11.8 | | | 8.12 | 1,755 |
| J44 | 15 | 11.7 | | | 5.85 | 1.25 | 11.8 | 11.7 | | | 11.7 | 1.25 | 11.8 | | | 16.25 | 2,340 |
| J45 | 15 | 11.7 | | | 11.7 | 1.25 | 11.8 | 11.7 | | | 17.55 | 1.25 | 11.8 | | | 24.37 | 2,825 |
| J46 | 15 | 11.7 | | | 17.55 | 1.25 | 11.8 | 11.7 | | | 23.4 | 1.25 | 11.8 | | | 32.5 | 3,410 |
| J47 | 15 | 11.7 | | | 23.4 | 1.25 | 11.8 | 11.7 | | | 35.1 | 1.25 | 11.8 | | | 48.75 | 4,580 |
| J48 | 15 | 11.7 | | | 35.1 | 1.25 | 11.8 | 11.7 | | | 46.8 | 1.25 | 11.8 | | | 65.0 | 5,750 |
| J49 | 20 | 16.62 | | | | 1.5 | 16.38 | 16.62 | | | 8.25 | 1.5 | 16.38 | | | 11.45 | 2,487 |
| J50 | 20 | 16.62 | | | 8.25 | 1.5 | 16.38 | 16.62 | | | 16.5 | 1.5 | 16.38 | | | 22.9 | 3,312 |
| J51 | 20 | 16.62 | | | 16.5 | 1.5 | 16.38 | 16.62 | | | 24.75 | 1.5 | 16.38 | | | 34.35 | 4,137 |
| J52 | 20 | 16.62 | | | 24.75 | 1.5 | 16.38 | 16.62 | | | 33.0 | 1.5 | 16.38 | | | 45.8 | 4,962 |
| J53 | 20 | 16.62 | | | 33.0 | 1.5 | 16.38 | 16.62 | | | 49.5 | 1.5 | 16.38 | | | 68.7 | 6,612 |
| J54 | 20 | 16.62 | | | 49.5 | 1.5 | 16.38 | 16.62 | | | 66.0 | 1.5 | 16.38 | | | 91.6 | 8,262 |

TABLE VI

| Ex. No. | OSC, Ex. No. | OSC, lbs. | Oxides - EtO, lbs. | Oxides - PrO, lbs. | Oxides - BuO, lbs. | Catalyst, lbs. | Solvent, lbs. | OSC, lbs. | Oxides - EtO, lbs. | Oxides - PrO, lbs. | Oxides - BuO, lbs. | Catalyst, lbs. | Solvent, lbs. | Molal ratio EtO to oxyalkyl. suscept. compd. | Molal ratio PrO to oxyalkyl. suscept. compd. | Molal ratio BuO to oxyalkyl. suscept. compd. | Theo. mol. wt. |
|---|---|---|---|---|---|---|---|---|---|---|---|---|---|---|---|---|---|
| K1 | J6 | 7.40 | 29.6 | | | 7.5 | 7.6 | 7.4 | 29.6 | 14.8 | | 7.5 | 7.6 | 67.2 | 25.5 | | 5,180 |
| K2 | J6 | 7.40 | 29.6 | 14.8 | | 7.5 | 7.6 | 7.4 | 29.6 | 22.2 | | 7.5 | 7.6 | 67.2 | 38.25 | | 5,920 |
| K3 | J6 | 7.40 | 29.6 | 22.2 | | 7.5 | 7.6 | 7.4 | 29.6 | 44.4 | | 7.5 | 7.6 | 67.2 | 76.5 | | 7,400 |
| K4 | J6 | 7.40 | 29.6 | 44.4 | | 7.5 | 7.6 | 7.4 | 29.6 | 51.8 | | 7.5 | 7.6 | 67.2 | 89.25 | | 8,880 |
| K5 | J6 | 7.40 | 29.6 | 51.8 | | 7.5 | 7.6 | 7.4 | 29.6 | 59.2 | | 7.5 | 7.6 | 67.2 | 102.0 | | 9,620 |
| K6 | J6 | 7.40 | 29.6 | 59.2 | | 7.5 | 7.6 | 7.4 | 29.6 | 88.8 | | 7.5 | 7.6 | 67.2 | 153.0 | | 12,580 |
| K7 | J12 | 11.7 | 46.8 | | | 1.25 | 11.8 | 11.7 | 46.8 | 23.4 | | 1.25 | 11.8 | 106.4 | 40.4 | | 8,190 |
| K8 | J12 | 11.7 | 46.8 | 23.4 | | 1.25 | 11.8 | 11.7 | 46.8 | 46.8 | | 1.25 | 11.8 | 106.4 | 80.8 | | 10,530 |
| K9 | J12 | 11.7 | 46.8 | 46.8 | | 1.25 | 11.8 | 11.7 | 46.8 | 70.2 | | 1.25 | 11.8 | 106.4 | 121.2 | | 12,870 |
| K10 | J12 | 11.7 | 46.8 | 70.2 | | 1.25 | 11.8 | 11.7 | 46.8 | 81.9 | | 1.25 | 11.8 | 106.4 | 140.4 | | 14,040 |
| K11 | J12 | 11.7 | 46.8 | 81.9 | | 1.25 | 11.8 | 11.7 | 46.8 | 93.6 | | 1.25 | 11.8 | 106.4 | 161.6 | | 15,210 |
| K12 | J12 | 11.7 | 46.8 | 93.6 | | 1.25 | 11.8 | 11.7 | 46.8 | 105.3 | | 1.25 | 11.8 | 106.4 | 181.8 | | 16,380 |
| K13 | J18 | 16.62 | 66.0 | | | 1.5 | 16.38 | 16.62 | 66.0 | 33.0 | | 1.5 | 16.38 | 150.0 | 56.88 | | 11,560 |
| K14 | J18 | 16.62 | 66.0 | 33.0 | | 1.5 | 16.38 | 16.62 | 66.0 | 49.5 | | 1.5 | 16.38 | 150.0 | 85.32 | | 13,210 |
| K15 | J18 | 16.62 | 66.0 | 49.5 | | 1.5 | 16.38 | 16.62 | 66.0 | 66.0 | | 1.5 | 16.38 | 150.0 | 113.76 | | 14,860 |
| K16 | J18 | 16.62 | 66.0 | 66.0 | | 1.5 | 16.38 | 16.62 | 66.0 | 82.5 | | 1.5 | 16.38 | 150.0 | 142.2 | | 16,510 |
| K17 | J18 | 16.62 | 66.0 | 82.5 | | 1.5 | 16.38 | 16.62 | 66.0 | 99.0 | | 1.5 | 16.38 | 150.0 | 170.64 | | 18,160 |
| K18 | J18 | 16.62 | 66.0 | 99.0 | | 1.5 | 16.38 | 16.62 | 66.0 | 132.0 | | 1.5 | 16.38 | 150.0 | 227.52 | | 21,460 |
| K19 | J24 | 7.4 | | 88.8 | | 0.75 | 7.6 | 7.4 | 3.7 | 88.8 | | 0.75 | 7.6 | 8.4 | 153.0 | | 9,950 |
| K20 | J24 | 7.4 | 3.7 | 88.8 | | 0.75 | 7.6 | 7.4 | 7.4 | 88.8 | | 0.75 | 7.6 | 16.8 | 153.0 | | 10,360 |
| K21 | J24 | 7.4 | 7.4 | 88.8 | | 0.75 | 7.6 | 7.4 | 11.1 | 88.8 | | 0.75 | 7.6 | 25.2 | 153.0 | | 10,730 |
| K22 | J24 | 7.4 | 11.1 | 88.8 | | 0.75 | 7.6 | 7.4 | 14.8 | 88.8 | | 0.75 | 7.6 | 33.6 | 153.0 | | 11,100 |
| K23 | J24 | 7.4 | 14.8 | 88.8 | | 0.75 | 7.6 | 7.4 | 22.2 | 88.8 | | 0.75 | 7.6 | 50.4 | 153.0 | | 11,840 |
| K24 | J24 | 7.4 | 22.2 | 88.8 | | 0.75 | 7.6 | 7.4 | 29.6 | 88.8 | | 0.75 | 7.6 | 67.2 | 153.0 | | 12,580 |
| K25 | J30 | 11.7 | | 93.6 | | 1.25 | 11.8 | 11.7 | 5.85 | 93.6 | | 1.25 | 11.8 | 13.3 | 161.6 | | 11,115 |
| K26 | J30 | 11.7 | 5.85 | 93.6 | | 1.25 | 11.8 | 11.7 | 11.70 | 93.6 | | 1.25 | 11.8 | 26.6 | 161.6 | | 11,700 |
| K27 | J30 | 11.7 | 11.7 | 93.6 | | 1.25 | 11.8 | 11.7 | 17.55 | 93.6 | | 1.25 | 11.8 | 39.9 | 161.6 | | 12,285 |
| K28 | J30 | 11.7 | 17.55 | 93.6 | | 1.25 | 11.8 | 11.7 | 23.40 | 93.6 | | 1.25 | 11.8 | 53.2 | 161.6 | | 12,870 |
| K29 | J30 | 11.7 | 23.4 | 93.6 | | 1.25 | 11.8 | 11.7 | 29.25 | 93.6 | | 1.25 | 11.8 | 66.5 | 161.6 | | 13,455 |
| K30 | J30 | 11.7 | 29.25 | 93.6 | | 1.25 | 11.8 | 11.7 | 35.1 | 93.6 | | 1.25 | 11.8 | 79.8 | 161.6 | | 14,040 |
| K31 | J36 | 16.62 | | 115.5 | | 1.5 | 16.38 | 16.62 | 8.25 | 115.5 | | 1.5 | 16.38 | 18.75 | 199.08 | | 14,037 |
| K32 | J36 | 16.62 | 8.25 | 115.5 | | 1.5 | 16.38 | 16.62 | 16.5 | 115.5 | | 1.5 | 16.38 | 37.50 | 199.08 | | 14,962 |
| K33 | J36 | 16.62 | 16.50 | 115.5 | | 1.5 | 16.38 | 16.62 | 24.75 | 115.5 | | 1.5 | 16.38 | 56.25 | 199.08 | | 15,787 |
| K34 | J36 | 16.62 | 24.75 | 115.5 | | 1.5 | 16.38 | 16.62 | 33.0 | 115.5 | | 1.5 | 16.38 | 75.0 | 199.08 | | 16,612 |
| K35 | J36 | 16.62 | 33.0 | 115.5 | | 1.5 | 16.38 | 16.62 | 41.25 | 115.5 | | 1.5 | 16.38 | 93.75 | 199.08 | | 17,437 |
| K36 | J36 | 16.62 | 41.25 | 115.5 | | 1.5 | 16.38 | 16.62 | 49.5 | 115.5 | | 1.5 | 16.38 | 112.5 | 199.08 | | 18,262 |
| K37 | J4 | 7.4 | 22.2 | | | .75 | 7.6 | 7.4 | 22.2 | | 7.4 | .75 | 7.6 | 50.4 | | 10.28 | 3,700 |
| K38 | J4 | 7.4 | 22.2 | | 7.4 | .75 | 7.6 | 7.4 | 22.2 | | 14.8 | .75 | 7.6 | 50.4 | | 20.56 | 4,440 |
| K39 | J4 | 7.4 | 22.2 | | 14.8 | .75 | 7.6 | 7.4 | 22.2 | | 22.2 | .75 | 7.6 | 50.4 | | 30.84 | 5,180 |
| K40 | J4 | 7.4 | 22.2 | | 22.2 | .75 | 7.6 | 7.4 | 22.2 | | 29.6 | .75 | 7.6 | 50.4 | | 41.12 | 5,920 |
| K41 | J4 | 7.4 | 22.2 | | 29.6 | .75 | 7.6 | 7.4 | 22.2 | | 33.3 | .75 | 7.6 | 50.4 | | 46.26 | 6,290 |
| K42 | J4 | 7.4 | 22.2 | | 33.0 | .75 | 7.6 | 7.4 | 22.2 | | 37.0 | .75 | 7.6 | 50.4 | | 51.4 | 6,660 |
| K43 | J10 | 11.7 | 29.25 | | | 1.25 | 11.8 | 11.7 | 29.25 | | 11.7 | 1.25 | 11.8 | 66.5 | | 16.25 | 5,265 |
| K44 | J10 | 11.7 | 29.25 | | 11.7 | 1.25 | 11.8 | 11.7 | 29.25 | | 23.4 | 1.25 | 11.8 | 66.5 | | 32.5 | 6,435 |
| K45 | J10 | 11.7 | 29.25 | | 23.4 | 1.25 | 11.8 | 11.7 | 29.25 | | 35.1 | 1.25 | 11.8 | 66.5 | | 48.75 | 7,605 |
| K46 | J10 | 11.7 | 29.25 | | 35.1 | 1.25 | 11.8 | 11.7 | 29.25 | | 46.8 | 1.25 | 11.8 | 66.5 | | 65.0 | 8,775 |
| K47 | J10 | 11.7 | 29.25 | | 46.8 | 1.25 | 11.8 | 11.7 | 29.25 | | 52.65 | 1.25 | 11.8 | 66.5 | | 73.12 | 9,360 |
| K48 | J10 | 11.7 | 29.25 | | 52.65 | 1.25 | 11.8 | 11.7 | 29.25 | | 58.5 | 1.25 | 11.8 | 66.5 | | 81.25 | 9,945 |
| K49 | J16 | 16.62 | 41.25 | | | 1.5 | 16.38 | 16.62 | 41.25 | | 16.5 | 1.5 | 16.38 | 93.75 | | 22.9 | 7,437 |
| K50 | J16 | 16.62 | 41.25 | | 16.50 | 1.5 | 16.38 | 16.62 | 41.25 | | 24.75 | 1.5 | 16.38 | 93.75 | | 34.35 | 8,262 |
| K51 | J16 | 16.62 | 41.25 | | 24.75 | 1.5 | 16.38 | 16.62 | 41.25 | | 33.00 | 1.5 | 16.38 | 93.75 | | 45.8 | 9,087 |
| K52 | J16 | 16.62 | 41.25 | | 33.0 | 1.5 | 16.35 | 16.62 | 41.25 | | 41.25 | 1.5 | 16.38 | 93.75 | | 57.25 | 9,912 |
| K53 | J16 | 16.62 | 41.25 | | 41.25 | 1.5 | 16.38 | 16.62 | 41.25 | | 49.5 | 1.5 | 16.38 | 93.75 | | 68.7 | 10,737 |
| K54 | J16 | 16.62 | 41.25 | | 49.5 | 1.5 | 16.38 | 16.62 | 41.25 | | 66.0 | 1.5 | 16.38 | 93.75 | | 91.6 | 12,387 |
| K55 | J42 | 7.4 | | | 37.0 | .75 | 7.6 | 7.4 | 3.7 | | 37.0 | .75 | 7.6 | 8.4 | | 51.4 | 4,810 |
| K56 | J42 | 7.4 | 3.7 | | 37.0 | .75 | 7.6 | 7.4 | 7.4 | | 37.0 | .75 | 7.6 | 16.8 | | 51.4 | 5,180 |
| K57 | J42 | 7.4 | 7.4 | | 37.0 | .75 | 7.6 | 7.4 | 11.1 | | 37.0 | .75 | 7.6 | 25.2 | | 51.4 | 5,550 |
| K58 | J42 | 7.4 | 11.1 | | 37.0 | .75 | 7.6 | 7.4 | 14.8 | | 37.0 | .75 | 7.6 | 33.6 | | 51.4 | 5,920 |
| K59 | J42 | 7.4 | 14.8 | | 37.0 | .75 | 7.6 | 7.4 | 18.5 | | 37.0 | .75 | 7.6 | 42.0 | | 51.4 | 6,290 |
| K60 | J42 | 7.4 | 18.5 | | 37.0 | .75 | 7.6 | 7.4 | 22.2 | | 37.0 | .75 | 7.6 | 50.4 | | 51.4 | 6,660 |
| K61 | J48 | 11.7 | | | 46.8 | 1.25 | 11.8 | 11.7 | 5.85 | | 46.8 | 1.25 | 11.8 | 23.3 | | 65.0 | 6,335 |
| K62 | J48 | 11.7 | 5.85 | | 46.8 | 1.25 | 11.8 | 11.7 | 11.70 | | 46.8 | 1.25 | 11.8 | 26.6 | | 65.0 | 6,920 |
| K63 | J48 | 11.7 | 11.7 | | 46.8 | 1.25 | 11.8 | 11.7 | 17.55 | | 46.8 | 1.25 | 11.8 | 49.9 | | 65.0 | 7,505 |
| K64 | J48 | 11.7 | 17.55 | | 46.8 | 1.25 | 11.8 | 11.7 | 23.4 | | 46.8 | 1.25 | 11.8 | 53.2 | | 65.0 | 8,090 |
| K65 | J48 | 11.7 | 23.4 | | 46.8 | 1.25 | 11.8 | 11.7 | 29.25 | | 46.8 | 1.25 | 11.8 | 66.5 | | 65.0 | 8,675 |
| K66 | J48 | 11.7 | 29.25 | | 46.8 | 1.25 | 11.8 | 11.7 | 35.1 | | 46.8 | 1.25 | 11.8 | 79.8 | | 65.0 | 9,260 |
| K67 | J54 | 16.62 | | | 66.0 | 1.5 | 16.38 | 16.62 | 8.25 | | 66.0 | 1.75 | 16.38 | 18.75 | | 91.6 | 9,087 |
| K68 | J54 | 16.62 | 8.25 | | 66.0 | 1.5 | 16.38 | 16.62 | 16.5 | | 66.0 | 1.75 | 16.38 | 37.5 | | 91.6 | 9,912 |
| K69 | J54 | 16.62 | 16.5 | | 66.0 | 1.5 | 16.38 | 16.62 | 24.75 | | 66.0 | 1.75 | 16.38 | 56.25 | | 91.6 | 10,737 |
| K70 | J54 | 16.62 | 24.75 | | 66.0 | 1.5 | 16.38 | 16.62 | 33.0 | | 66.0 | 1.75 | 16.38 | 75.0 | | 91.6 | 11,562 |
| K71 | J54 | 16.62 | 33.0 | | 66.0 | 1.5 | 16.38 | 16.62 | 41.25 | | 66.0 | 1.75 | 16.38 | 93.75 | | 91.6 | 12,387 |
| K72 | J54 | 16.62 | 41.25 | | 66.0 | 1.5 | 16.38 | 16.62 | 49.50 | | 66.0 | 1.75 | 16.38 | 112.5 | | 91.6 | 13,212 |
| K73 | J40 | 7.4 | | | 14.8 | 1.0 | 7.6 | 7.4 | | 14.8 | 14.8 | 1.0 | 7.6 | | 25.5 | 20.56 | 3,700 |
| K74 | J40 | 7.4 | | 14.8 | 14.8 | 1.0 | 7.6 | 7.4 | | 22.2 | 14.8 | 1.0 | 7.6 | | 38.25 | 20.56 | 4,440 |
| K75 | J40 | 7.4 | | 22.2 | 14.8 | 1.0 | 7.6 | 7.4 | | 29.6 | 14.8 | 1.0 | 7.6 | | 51.0 | 20.56 | 5,180 |
| K76 | J40 | 7.4 | | 29.6 | 14.8 | 1.0 | 7.6 | 7.4 | | 44.4 | 14.8 | 1.0 | 7.6 | | 76.5 | 20.56 | 6,660 |
| K77 | J40 | 7.4 | | 44.4 | 14.8 | 1.0 | 7.6 | 7.4 | | 59.2 | 14.8 | 1.0 | 7.6 | | 102.0 | 20.56 | 8,140 |
| K78 | J40 | 7.4 | | 59.2 | 14.8 | 1.0 | 7.6 | 7.4 | | 88.8 | 14.8 | 1.0 | 7.6 | | 153.0 | 20.56 | 11,100 |
| K79 | J46 | 11.7 | | | 23.4 | 1.5 | 11.8 | 11.7 | | 23.4 | 23.4 | 1.5 | 11.8 | | 40.4 | 32.5 | 5,750 |
| K80 | J46 | 11.7 | | 23.4 | 23.4 | 1.5 | 11.8 | 11.7 | | 35.1 | 23.4 | 1.5 | 11.8 | | 60.6 | 32.5 | 6,920 |
| K81 | J46 | 11.7 | | 35.1 | 23.4 | 1.5 | 11.8 | 11.7 | | 46.8 | 23.4 | 1.5 | 11.8 | | 80.8 | 32.5 | 8,090 |
| K82 | J46 | 11.7 | | 46.8 | 23.4 | 1.5 | 11.8 | 11.7 | | 70.2 | 23.4 | 1.5 | 11.8 | | 121.2 | 32.5 | 10,430 |
| K83 | J46 | 11.7 | | 70.2 | 23.4 | 1.5 | 11.8 | 11.7 | | 93.6 | 23.4 | 1.5 | 11.8 | | 161.6 | 32.5 | 12,770 |
| K84 | J46 | 11.7 | | 93.6 | 23.4 | 1.5 | 11.8 | 11.7 | | 105.3 | 23.4 | 1.5 | 11.8 | | 181.8 | 32.5 | 15,110 |
| K85 | J52 | 16.62 | | | 33.0 | 1.75 | 16.38 | 16.62 | | 33.0 | 33.0 | 1.75 | 16.38 | | 56.88 | 45.8 | 8,262 |
| K86 | J52 | 16.62 | | 33.0 | 33.0 | 1.75 | 16.38 | 16.62 | | 49.5 | 33.0 | 1.75 | 16.38 | | 85.32 | 45.8 | 9,912 |
| K87 | J52 | 16.62 | | 49.5 | 33.0 | 1.75 | 16.38 | 16.62 | | 66.0 | 33.0 | 1.75 | 16.38 | | 113.76 | 45.8 | 11,562 |
| K88 | J52 | 16.62 | | 66.0 | 33.0 | 1.75 | 16.38 | 16.62 | | 82.5 | 33.0 | 1.75 | 16.38 | | 142.2 | 45.8 | 13,212 |
| K89 | J52 | 16.62 | | 82.5 | 33.0 | 1.75 | 16.38 | 16.62 | | 99.0 | 33.0 | 1.75 | 16.38 | | 170.64 | 45.8 | 14,862 |
| K90 | J52 | 16.62 | | 99.0 | 33.0 | 1.75 | 16.38 | 16.62 | | 115.5 | 33.0 | 1.75 | 16.38 | | 199.08 | 45.8 | 16,512 |

TABLE VII

| Ex. No. | OSC, Ex. No. | OSC, lbs. | Composition before — Oxides | | | Catalyst, lbs. | Solvent, lbs. | OSC, lbs. | Composition at end — Oxides | | | Catalyst, lbs. | Solvent, lbs. | Molal ratio | | | Theo. mol. wt. |
|---|---|---|---|---|---|---|---|---|---|---|---|---|---|---|---|---|---|
| | | | EtO, lbs. | PrO, lbs. | BuO, lbs. | | | | EtO, lbs. | PrO, lbs. | BuO, lbs. | | | EtO to oxyalkyl. suscept. compd. | PrO to oxyalkyl. suscept. compd. | BuO to oxyalkyl. suscept. compd. | |
| L1 | K78 | 7.4 | | 88.8 | 14.8 | 1.0 | 7.6 | 7.4 | 3.7 | 88.8 | 14.8 | 1.0 | 7.6 | 8.4 | 153.0 | 20.56 | 11,470 |
| L2 | K78 | 7.4 | 3.7 | 88.8 | 14.8 | 1.0 | 7.6 | 7.4 | 7.4 | 88.8 | 14.8 | 1.0 | 7.6 | 16.8 | 153.0 | 20.56 | 11,840 |
| L3 | K78 | 7.4 | 7.4 | 88.8 | 14.8 | 1.0 | 7.6 | 7.4 | 11.1 | 88.8 | 14.8 | 1.0 | 7.6 | 25.2 | 153.0 | 20.56 | 12,210 |
| L4 | K78 | 7.4 | 11.1 | 88.8 | 14.8 | 1.0 | 7.6 | 7.4 | 14.8 | 88.8 | 14.8 | 1.0 | 7.6 | 33.6 | 153.0 | 20.56 | 12,580 |
| L5 | K78 | 7.4 | 14.8 | 88.8 | 14.8 | 1.0 | 7.6 | 7.4 | 18.5 | 88.8 | 14.8 | 1.0 | 7.6 | 42.0 | 153.0 | 20.56 | 12,950 |
| L6 | K78 | 7.4 | 18.5 | 88.8 | 14.8 | 1.0 | 7.6 | 7.4 | 22.2 | 88.8 | 14.8 | 1.0 | 7.6 | 50.4 | 153.0 | 20.56 | 13,320 |
| L7 | K84 | 11.7 | | 105.3 | 23.4 | 1.5 | 11.8 | 11.7 | 5.85 | 105.3 | 23.4 | 1.5 | 11.8 | 13.3 | 18.18 | 32.5 | 15,695 |
| L8 | K84 | 11.7 | 5.85 | 105.3 | 23.4 | 1.5 | 11.8 | 11.7 | 11.70 | 105.3 | 23.4 | 1.5 | 11.8 | 26.6 | 18.18 | 32.5 | 16,280 |
| L9 | K84 | 11.7 | 11.70 | 105.3 | 23.4 | 1.5 | 11.8 | 11.7 | 17.55 | 105.3 | 23.4 | 1.5 | 11.8 | 39.9 | 18.18 | 32.5 | 16,865 |
| L10 | K84 | 11.7 | 17.55 | 105.3 | 23.4 | 1.5 | 11.8 | 11.7 | 23.40 | 105.3 | 23.4 | 1.5 | 11.8 | 53.2 | 18.18 | 32.5 | 17,450 |
| L11 | K84 | 11.7 | 23.4 | 105.3 | 23.4 | 1.5 | 11.8 | 11.7 | 29.25 | 105.3 | 23.4 | 1.5 | 11.8 | 66.5 | 18.18 | 32.5 | 18,035 |
| L12 | K84 | 11.7 | 29.25 | 105.3 | 23.4 | 1.5 | 11.8 | 11.7 | 35.10 | 105.3 | 23.4 | 1.5 | 11.8 | 79.8 | 18.18 | 32.5 | 18,620 |
| L13 | K90 | 16.62 | | 115.5 | 33.0 | 1.75 | 16.38 | 16.62 | 8.25 | 115.5 | 33.0 | 1.75 | 16.38 | 18.75 | 199.08 | 45.8 | 17,337 |
| L14 | K90 | 16.62 | 8.25 | 115.5 | 33.0 | 1.75 | 16.38 | 16.62 | 16.50 | 115.5 | 33.0 | 1.75 | 16.38 | 37.5 | 199.08 | 45.8 | 18,162 |
| L15 | K90 | 16.62 | 16.50 | 115.5 | 33.0 | 1.75 | 16.38 | 16.62 | 24.75 | 115.5 | 33.0 | 1.75 | 16.38 | 56.25 | 199.08 | 45.8 | 18,987 |
| L16 | K90 | 16.62 | 24.75 | 115.5 | 33.0 | 1.75 | 16.38 | 16.62 | 33.0 | 115.5 | 33.0 | 1.75 | 16.38 | 75.0 | 199.08 | 45.8 | 19,812 |
| L17 | K90 | 16.62 | 33.0 | 115.5 | 33.0 | 1.75 | 16.38 | 16.62 | 41.25 | 115.5 | 33.0 | 1.75 | 16.38 | 93.75 | 199.08 | 45.8 | 20,637 |
| L18 | K90 | 16.62 | 41.25 | 115.5 | 33.0 | 1.75 | 16.38 | 16.62 | 49.50 | 115.5 | 33.0 | 1.75 | 16.38 | 112.5 | 199.08 | 45.8 | 21,462 |
| L19 | K58 | 7.4 | 14.8 | | 37.0 | 1.0 | 7.6 | 7.4 | 14.8 | 7.4 | 37.0 | 1.0 | 7.6 | 33.6 | 12.75 | 51.4 | 6,660 |
| L20 | K58 | 7.4 | 14.8 | 7.4 | 37.0 | 1.0 | 7.6 | 7.4 | 14.8 | 14.8 | 37.0 | 1.0 | 7.6 | 33.6 | 25.5 | 51.4 | 7,400 |
| L21 | K58 | 7.4 | 14.8 | 14.8 | 37.0 | 1.0 | 7.6 | 7.4 | 14.8 | 22.2 | 37.0 | 1.0 | 7.6 | 33.6 | 38.25 | 51.4 | 8,140 |
| L22 | K58 | 7.4 | 14.8 | 22.2 | 37.0 | 1.0 | 7.6 | 7.4 | 14.8 | 29.6 | 37.0 | 1.0 | 7.6 | 33.6 | 51.0 | 51.4 | 8,880 |
| L23 | K58 | 7.4 | 14.8 | 29.6 | 37.0 | 1.0 | 7.6 | 7.4 | 14.8 | 37.0 | 37.0 | 1.0 | 7.6 | 33.6 | 63.75 | 51.4 | 9,620 |
| L24 | K58 | 7.4 | 14.8 | 37.0 | 37.0 | 1.0 | 7.6 | 7.4 | 14.8 | 44.4 | 37.0 | 1.0 | 7.6 | 33.6 | 76.5 | 51.4 | 10,360 |
| L25 | K64 | 11.7 | 23.4 | | 46.8 | 1.25 | 11.8 | 11.7 | 23.4 | 11.7 | 46.8 | 1.25 | 11.8 | 53.2 | 20.2 | 65.0 | 9,260 |
| L26 | K64 | 11.7 | 23.4 | 11.7 | 46.8 | 1.25 | 11.8 | 11.7 | 23.4 | 23.4 | 46.8 | 1.25 | 11.8 | 53.2 | 40.4 | 65.0 | 10,430 |
| L27 | K64 | 11.7 | 23.4 | 23.4 | 46.8 | 1.25 | 11.8 | 11.7 | 23.4 | 35.1 | 46.8 | 1.25 | 11.8 | 53.2 | 60.6 | 65.0 | 11,600 |
| L28 | K64 | 11.7 | 23.4 | 35.1 | 46.8 | 1.25 | 11.8 | 11.7 | 23.4 | 46.8 | 46.8 | 1.25 | 11.8 | 53.2 | 80.0 | 65.0 | 12,770 |
| L29 | K64 | 11.7 | 23.4 | 46.8 | 46.8 | 1.25 | 11.8 | 11.7 | 23.4 | 58.5 | 46.8 | 1.25 | 11.8 | 53.2 | 101.0 | 65.0 | 13,940 |
| L30 | K64 | 11.7 | 23.4 | 58.5 | 46.8 | 1.25 | 11.8 | 11.7 | 23.4 | 70.2 | 46.8 | 1.25 | 11.8 | 53.2 | 121.2 | 65.0 | 15,110 |
| L31 | K71 | 16.62 | 41.25 | | 66.0 | 1.5 | 16.38 | 16.62 | 41.25 | 16.5 | 66.0 | 1.5 | 16.38 | 93.75 | 28.44 | 91.6 | 14,037 |
| L32 | K71 | 16.62 | 41.25 | 16.5 | 66.0 | 1.5 | 16.38 | 16.62 | 41.25 | 33.0 | 66.0 | 1.5 | 16.38 | 93.75 | 56.88 | 91.6 | 15,687 |
| L33 | K71 | 16.62 | 41.25 | 33.0 | 66.0 | 1.5 | 16.38 | 16.62 | 41.25 | 49.5 | 66.0 | 1.5 | 16.38 | 93.75 | 85.32 | 91.6 | 17,337 |
| L34 | K71 | 16.62 | 41.25 | 49.5 | 66.0 | 1.5 | 16.38 | 16.62 | 41.25 | 66.0 | 66.0 | 1.5 | 16.38 | 93.75 | 113.76 | 91.6 | 18,987 |
| L35 | K71 | 16.62 | 41.25 | 66.0 | 66.0 | 1.5 | 16.38 | 16.62 | 41.25 | 82.5 | 66.0 | 1.5 | 16.38 | 93.75 | 142.20 | 91.6 | 20,637 |
| L36 | K71 | 16.62 | 41.25 | 82.5 | 66.0 | 1.5 | 16.38 | 16.62 | 41.25 | 99.0 | 66.0 | 1.5 | 16.38 | 93.75 | 170.64 | 91.6 | 22,287 |

TABLE VIII

| Ex. No. | Max. temp., °C. | Max. pres., p. s. i. | Time, hrs. | Solubility | | |
|---|---|---|---|---|---|---|
| | | | | Water | Xylene | Kerosene |
| J1 | 125-130 | 10-15 | 1 | Emulsifiable | Soluble | Insoluble. |
| J2 | 125-130 | 10-15 | 1 | do | do | Do. |
| J3 | 125-130 | 10-15 | ¾ | Soluble | Insoluble | Do. |
| J4 | 125-130 | 10-15 | ¾ | do | do | Do. |
| J5 | 125-130 | 10-15 | 1 | do | do | Do. |
| J6 | 125-130 | 10-15 | 1¼ | do | do | Do. |
| J7 | 125-130 | 10-15 | 2 | Emulsifiable | Soluble | Do. |
| J8 | 125-130 | 10-15 | 1 | do | do | Do. |
| J9 | 125-130 | 10-15 | 1 | Soluble | do | Do. |
| J10 | 125-130 | 10-15 | 1¼ | do | do | Do. |
| J11 | 125-130 | 10-15 | 1½ | do | Insoluble | Do. |
| J12 | 125-130 | 10-15 | 3 | do | do | Do. |
| J13 | 125,130 | 10-15 | 2½ | do | Soluble | Do. |
| J14 | 125-130 | 10-15 | 1 | do | do | Do. |
| J15 | 125-130 | 10-15 | 1 | do | do | Do. |
| J16 | 125-130 | 10-15 | 1¼ | do | do | Do. |
| J17 | 125-130 | 10-15 | 1½ | do | do | Do. |
| J18 | 125-130 | 10-15 | 3¼ | do | do | Do. |
| J19 | 125-130 | 10-15 | 1½ | Insoluble | do | Do. |
| J20 | 125-130 | 10-15 | 2 | do | do | Do. |
| J21 | 125-130 | 10-15 | 2 | do | do | Do. |
| J22 | 125-130 | 10-15 | 2¼ | do | do | Do. |
| J23 | 125-130 | 10-15 | 4½ | do | do | Do. |
| J24 | 125-130 | 10-15 | 9 | do | do | Soluble. |
| J25 | 125-130 | 10-15 | 2 | do | do | Insoluble. |
| J26 | 125-130 | 10-15 | 2¼ | do | do | Do. |
| J27 | 125-130 | 10-15 | 2½ | do | do | Do. |
| J28 | 125-130 | 10-15 | 2½ | do | do | Do. |
| J29 | 125-130 | 10-15 | 5 | do | do | Soluble. |
| J30 | 125-130 | 10-15 | 5½ | do | do | Do. |
| J31 | 125-130 | 10-15 | 2½ | Emulsifiable | do | Insoluble. |
| J32 | 125-130 | 10-15 | 2½ | Insoluble | do | Do. |
| J33 | 125-130 | 10-15 | 2¾ | do | do | Do. |
| J34 | 125-130 | 10-15 | 5½ | do | do | Do. |
| J35 | 125-130 | 10-15 | 11 | do | do | Soluble. |
| J36 | 125-130 | 10-15 | 6 | do | do | Insoluble. |
| J37 | 140-150 | 10-15 | 1½ | do | do | Do. |
| J38 | 140-150 | 10-15 | 1½ | do | do | Do. |
| J39 | 140-150 | 10-15 | 1¾ | do | do | Soluble. |
| J40 | 140-150 | 10-15 | 2 | do | do | Do. |
| J41 | 140-150 | 10-15 | 6 | do | do | Do. |
| J42 | 140-150 | 10-15 | 5 | do | do | Do. |
| J43 | 140-150 | 10-15 | 1½ | do | do | Do. |
| J44 | 140-150 | 10-15 | 1¾ | do | do | Do. |
| J45 | 140-150 | 10-15 | 2 | do | do | Do. |
| J46 | 140-150 | 10-15 | 2½ | do | do | Do. |
| J47 | 140-150 | 10-15 | 5 | do | do | Do. |
| J48 | 140-150 | 10-15 | 6 | do | do | Insoluble. |
| J49 | 140-150 | 10-15 | 1¼ | do | do | Do. |
| J50 | 140-150 | 10-15 | 1½ | do | do | Do. |
| J51 | 140-150 | 10-15 | 1½ | do | do | Do. |
| J52 | 140-150 | 10-15 | 2 | do | do | Do. |
| J53 | 140-150 | 10-15 | 5 | do | do | Soluble. |
| J54 | 140-150 | 10-15 | 5¼ | do | do | Do. |

TABLE IX

| Ex. No. | Max. temp., °C. | Max. pres., p.s.i. | Time, hrs. | Solubility Water | Solubility Xylene | Solubility Kerosene |
|---|---|---|---|---|---|---|
| K1 | 125–130 | 10–15 | 9 | Emulsifiable | Soluble | Insoluble. |
| K2 | 125–130 | 10–15 | 1¾ | do | do | Do. |
| K3 | 125–130 | 10–15 | 5 | do | do | Do. |
| K4 | 125–130 | 10–15 | 2½ | do | do | Do. |
| K5 | 125–130 | 10–15 | 3 | do | do | Do. |
| K6 | 125–130 | 10–15 | 8½ | do | do | Do. |
| K7 | 125–130 | 10–15 | 15 | do | do | Do. |
| K8 | 125–130 | 10–15 | 4¾ | do | do | Do. |
| K9 | 125–130 | 10–15 | 5 | do | do | Do. |
| K10 | 125–130 | 10–15 | 3 | do | do | Do. |
| K11 | 125–130 | 10–15 | 3½ | do | do | Do. |
| K12 | 125–130 | 10–15 | 4 | do | do | Do. |
| K13 | 125–130 | 10–15 | 18½ | do | do | Do. |
| K14 | 125–130 | 10–15 | 5 | do | do | Do. |
| K15 | 125–130 | 10–15 | 5½ | do | do | Do. |
| K16 | 125–130 | 10–15 | 5½ | do | do | Do. |
| K17 | 125–130 | 10–15 | 6 | do | do | Do. |
| K18 | 125–130 | 10–15 | 6¼ | do | do | Do. |
| K19 | 125–130 | 10–15 | 22 | Insoluble | do | Soluble. |
| K20 | 125–130 | 10–15 | ½ | do | do | Insoluble. |
| K21 | 125–130 | 10–15 | ¾ | do | do | Do. |
| K22 | 125–130 | 10–15 | 1 | do | do | Do. |
| K23 | 125–130 | 10–15 | 2 | Emulsifiable | do | Do. |
| K24 | 125–130 | 10–15 | 2½ | do | do | Do. |
| K25 | 125–130 | 10–15 | 20½ | Insoluble | do | Soluble. |
| K26 | 125–130 | 10–15 | ¾ | do | do | Insoluble. |
| K27 | 125–130 | 10–15 | 1 | do | do | Do. |
| K28 | 125–130 | 10–15 | 1 | Emulsifiable | do | Do. |
| K29 | 125–130 | 10–15 | 1¼ | do | do | Do. |
| K30 | 125–130 | 10–15 | 1½ | do | do | Do. |
| K31 | 125–130 | 10–15 | 31½ | Insoluble | do | Do. |
| K32 | 125–130 | 10–15 | 1 | do | do | Do. |
| K33 | 125–130 | 10–15 | 1¼ | Emulsifiable | do | Do. |
| K34 | 125–130 | 10–15 | 1½ | do | do | Do. |
| K35 | 125–130 | 10–15 | 1¾ | do | do | Do. |
| K36 | 125–130 | 10–15 | 2 | do | do | Do. |
| K37 | 125–145 | 10–15 | 7¾ | do | do | Do. |
| K38 | 145–150 | 10–15 | 2½ | do | do | Do. |
| K39 | 145–150 | 10–15 | 2½ | do | do | Do. |
| K40 | 145–150 | 10–15 | 2¾ | do | do | Do. |
| K41 | 145–150 | 10–15 | 3 | do | do | Do. |
| K42 | 145–150 | 10–15 | 3¼ | do | do | Do. |
| K43 | 125–140 | 10–15 | 8¼ | do | do | Do. |
| K44 | 145–130 | 10–15 | 3½ | do | do | Do. |
| K45 | 145–130 | 10–15 | 3¾ | do | do | Do. |
| K46 | 145–130 | 10–15 | 4 | do | do | Do. |
| K47 | 145–130 | 10–15 | 4½ | do | do | Do. |
| K48 | 145–130 | 10–15 | 3¾ | do | do | Do. |
| K49 | 125–140 | 10–15 | 10½ | do | do | Do. |
| K50 | 140–150 | 10–15 | 2½ | do | do | Do. |
| K51 | 140–150 | 10–15 | 3 | do | do | Do. |
| K52 | 140–150 | 10–15 | 3½ | do | do | Do. |
| K53 | 140–150 | 10–15 | 4 | do | do | Do. |
| K54 | 140–150 | 10–15 | 4½ | do | do | Do. |
| K55 | 150–125 | 10–15 | 18 | Insoluble | do | Do. |
| K56 | 125–130 | 10–15 | ½ | do | do | Do. |
| K57 | 125–130 | 10–15 | ¾ | Emulsifiable | do | Do. |
| K58 | 125–130 | 10–15 | ¾ | do | do | Do. |
| K59 | 125–130 | 10–15 | 1 | do | do | Do. |
| K60 | 125–130 | 10–15 | 1 | do | do | Do. |
| K61 | 150–125 | 10–15 | 19½ | Insoluble | do | Do. |
| K62 | 125–130 | 10–15 | ¾ | do | do | Do. |
| K63 | 125–130 | 10–15 | ¾ | Emulsifiable | do | Do. |
| K64 | 125–130 | 10–15 | 1 | do | do | Do. |
| K65 | 125–130 | 10–15 | 1¼ | do | do | Do. |
| K66 | 125–130 | 10–15 | 1¾ | do | do | Do. |
| K67 | 150–125 | 10–15 | 17½ | Insoluble | do | Do. |
| K68 | 125–130 | 10–15 | 1 | do | do | Do. |
| K69 | 125–130 | 10–15 | 1 | Emulsifiable | do | Do. |
| K70 | 125–130 | 10–15 | 1¼ | do | do | Do. |
| K71 | 125–130 | 10–15 | 1½ | do | do | Do. |
| K72 | 125–130 | 10–15 | 2 | do | do | Do. |
| K73 | 150–125 | 10–15 | 9¼ | Insoluble | do | Soluble. |
| K74 | 125–130 | 10–15 | 1½ | do | do | Do. |
| K75 | 125–130 | 10–15 | 1½ | do | do | Do. |
| K76 | 125–130 | 10–15 | 3¼ | do | do | Do. |
| K77 | 125–130 | 10–15 | 3¾ | do | do | Do. |
| K78 | 125–130 | 10–15 | 8 | do | do | Do. |
| K79 | 150–125 | 10–15 | 10¾ | do | do | Do. |
| K80 | 125–130 | 10–15 | 2¾ | do | do | Do. |
| K81 | 125–130 | 10–15 | 3 | do | do | Do. |
| K82 | 125–130 | 10–15 | 6½ | do | do | Do. |
| K83 | 125–130 | 10–15 | 7 | do | do | Do. |
| K84 | 125–130 | 10–15 | 4½ | do | do | Do. |
| K85 | 150–125 | 10–15 | 10¼ | do | do | Do. |
| K86 | 125–130 | 10–15 | 3 | do | do | Do. |
| K87 | 125–130 | 10–15 | 3½ | do | do | Do. |
| K88 | 125–130 | 10–15 | 4 | do | do | Do. |
| K89 | 125–130 | 10–15 | 5 | do | do | Do. |
| K90 | 125–130 | 10–15 | 5 | do | do | Do. |

TABLE X

| Ex. No. | Max. temp., °C. | Max. pres., p.s.i. | Time, hrs. | Solubility | | |
|---|---|---|---|---|---|---|
| | | | | Water | Xylene | Kerosene |
| L1 | 145-125 | 10-15 | 28 | Insoluble | Soluble | Soluble. |
| L2 | 125-130 | 10-15 | ¾ | ----do---- | ----do---- | Do. |
| L3 | 125-130 | 10-15 | 1 | ----do---- | ----do---- | Insoluble. |
| L4 | 125-130 | 10-15 | 1½ | ----do---- | ----do---- | Do. |
| L5 | 125-130 | 10-15 | 2 | Emulsifiable | ----do---- | Do. |
| L6 | 125-130 | 10-15 | 3 | ----do---- | ----do---- | Do. |
| L7 | 150-125 | 10-15 | 34½ | Insoluble | ----do---- | Soluble. |
| L8 | 125-130 | 10-15 | 1 | ----do---- | ----do---- | Do. |
| L9 | 125-130 | 10-15 | 1½ | ----do---- | ----do---- | Do. |
| L10 | 125-130 | 10-15 | 2 | ----do---- | ----do---- | Do. |
| L11 | 125-130 | 10-15 | 2¾ | Emulsifiable | ----do---- | Do. |
| L12 | 125-130 | 10-15 | 3 | ----do---- | ----do---- | Do. |
| L13 | 150-125 | 10-15 | 37¾ | Insoluble | ----do---- | Do. |
| L14 | 125-130 | 10-15 | 2 | ----do---- | ----do---- | Do. |
| L15 | 125-130 | 10-15 | 2½ | ----do---- | ----do---- | Do. |
| L16 | 125-130 | 10-15 | 3 | Emulsifiable | ----do---- | Insoluble. |
| L17 | 125-130 | 10-15 | 3¼ | ----do---- | ----do---- | Do. |
| L18 | 125-130 | 10-15 | 4 | ----do---- | ----do---- | Do. |
| L19 | 150-125 | 10-15 | 23 | ----do---- | ----do---- | Do. |
| L20 | 125-130 | 10-15 | 2 | ----do---- | ----do---- | Do. |
| L21 | 125-130 | 10-15 | 2¼ | ----do---- | ----do---- | Do. |
| L22 | 125-130 | 10-15 | 3 | Insoluble | ----do---- | Do. |
| L23 | 125-130 | 10-15 | 3 | ----do---- | ----do---- | Do. |
| L24 | 125-130 | 10-15 | 3½ | ----do---- | ----do---- | Do. |
| L25 | 150-125 | 10-15 | 25 | Emulsifiable | ----do---- | Do. |
| L26 | 125-130 | 10-15 | 3 | ----do---- | ----do---- | Do. |
| L27 | 125-130 | 10-15 | 3 | Insoluble | ----do---- | Do. |
| L28 | 125-130 | 10-15 | 3½ | ----do---- | ----do---- | Do. |
| L29 | 125-130 | 10-15 | 4 | ----do---- | ----do---- | Do. |
| L30 | 125-130 | 10-15 | 4¾ | ----do---- | ----do---- | Do. |
| L31 | 150-125 | 10-15 | 25¾ | Emulsifiable | ----do---- | Do. |
| L32 | 125-130 | 10-15 | 3½ | ----do---- | ----do---- | Do. |
| L33 | 125-130 | 10-15 | 4 | ----do---- | ----do---- | Do. |
| L34 | 125-130 | 10-15 | 4½ | Insoluble | ----do---- | Do. |
| L35 | 125-130 | 10-15 | 5 | ----do---- | ----do---- | Do. |
| L36 | 125-130 | 10-15 | 5½ | ----do---- | ----do---- | Do. |

PART 5

As to the use of conventional demulsifying agents reference is made to U. S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, referece should be to Example K2, herein described.

Having thus described our invention, what we claim as new and desire to secure by Letters Patent is:

1. A process for breaking petroleum emulsions of the water-in-oil type characterized by subjecting the emulsion to the action of a demulsifier including synthetic hydrophile products, said synthetic hydrophile products being the end product of a two-step manufacturing method consisting of first reacting (A) a monomeric organic non-resinous nitrogen-containing compound having at least one nitrogen atom selected from the class consisting of amino and amido nitrogen atoms and having at least one reactive hydrogen atom, and (B) nonaryl hydrophile polyepoxides characterized by the fact that the precursory polyhydric alcohol, in which an oxygen-linked hydrogen atom is replaced subsequently by the radical

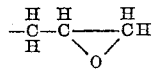

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; with the further proviso that said reactive compounds (A) and (B) be members of the class consisting of non-thermosetting solvent-soluble liquids and low-melting solids; with the added proviso that the reaction product be a member of the class consisting of acylation- and oxyalkylation-susceptible solvent-soluble liquids and low-melting solids; and said reaction between (A) and (B) being conducted below the pyrolytic point of the reactants and the resultants of reaction; followed by a second step of reacting said polyepoxide-derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

2. A process for breaking petroleum emulsions of the water-in-oil type characterized by subjecting the emulsion to the action of a demulsifier including synthetic hydrophile products; said synthetic hydrophile products being the end product of a two-step manufacturing method consisting of first reacting (A) a monomeric organic non-resinous nitrogen-containig compound having at least one nitrogen atom selected from the class consisting of amino and amido nitrogen atoms and having at least one reactive hydrogen atom, and (B) nonaryl hydrophile polyepoxides characterized by the fact that the precursory polyhydric alcohol, in which an oxygen-linked hydrogen atom is replaced subsequently by the radical

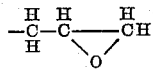

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; said polyepoxides being characterized by having present not more than 20 carbon atoms; with a further proviso that said reactive compounds (A) and (B) be members of the class consisting of non-thermosetting solvent-soluble liquids and low-melting solids; with the added proviso that the reaction product be a member of the class consisting of acylation- and oxyalkylation-susceptible solvent-soluble liquids and low-melting solids; said reaction between (A) and (B) being conducted below the pyrolytic point of the reactants and the resultants of reaction; followed by a second step of reacting said polyepoxide-derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

3. A process for breaking petroleum emulsions of the water-in-oil type characterized by subjecting the emulsion to the action of a demulsifier including synthetic hydrophile products; said synthetic hydrophile products being the end product of a two-step manufacturing method consisting of first reacting (A) a monomeric organic non-resinous nitrogen-containing compound having at least one nitrogen atom selected from the class consisting of amino and amido nitrogen atoms and having at least one reactive hydrogen atom, and (B) nonaryl hydrophile diepoxides characterized by the fact that the precursory polyhydric alcohol, in which an oxygen-linked hydrogen atom is replaced subsequently by the radical

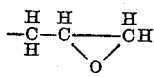

in the diepoxide, is water-soluble; said diepoxides being free from reactive functional groups other than epoxy and hydroxyl groups and characterized by the fact that the divalent linkage uniting the terminal oxirane rings is free from any radical having more than 4 uninterrupted carbon atoms in a single chain; said diepoxide being characterized by having present not more than 20 carbon atoms; with the further proviso that said reactive compounds (A) and (B) be members of the class consisting of non-thermosetting solvent-soluble liquids and low-melting solids; with the added proviso that the reaction product be a member of the class consisting of acylation- and oxyalkylation-susceptible solvent-soluble liquids and low-melting solids; said reaction between (A) and (B) being conducted below the pyrolytic point of the reactants and the resultants of reaction; followed by a second step of reacting said diepoxide-derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

4. A process for breaking petroleum emulsions of the water-in-oil-type characterized by subjecting the emulsion to the action of a demulsifier including synthetic hydrophile products; said synthetic hydrophile products being the end product of a two-step manufacturing method consisting of first reacting (A) a monomeric organic non-resinous nitrogen-containing compound having at least one basic amino nitrogen atom and containing at least one reactive hydrogen atom, and (B) nonaryl hydrophile diepoxides characterized by the fact that the precursory polyhydric alcohol, in which an oxygen-linked hydrogen atom is replaced subsequently by the radical

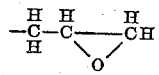

in the diepoxide, is water-soluble; said diepoxides being free from reactive functional groups other than epoxy and hydroxyl groups and characterized by the fact that the divalent linkage uniting the terminal oxirane rings is free from any radical having more than 4 uninterrupted carbon atoms in a single chain; said diepoxides being characterized by having present not more than 20 carbon atoms; with the further proviso that said reactive compounds (A) and (B) be members of the class consisting of non-thermosetting solvent-soluble liquids and low-melting solids; with the added proviso that the reaction product be a member of the class consisting of acylation- and oxyalkylation-susceptible solvent-soluble liquids and low-melting solids; said reaction between (A) and (B) being conducted below the pyrolytic point of the reactants and the resultants of reaction; followed by a second step of reacting said diepoxide-derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

5. The process of claim 4 wherein the diepoxide contains at least one reactive hydroxyl radical.

6. A process for breaking petroleum emulsions of the water-in-oil type characterized by subjecting the emulsion to the action of a demulsifier including synthetic hydrophile products; said synthetic hydrophile products being the end product of a two-step manufacturing method consisting of first reacting (A) a monomeric organic non-resinous nitrogen-containing compound having at least one basic amino nitrogen atom and containing at least one reactive hydrogen atom, and (B) a hydroxylated diepoxypolyglycerol having not more than 20 carbon atoms; with the further proviso that said reactive compounds (A) and (B) be members of the class consisting of non-thermosetting solvent-soluble liquids and low-melting solids; with the added proviso that the reaction product be a member of the class consisting of acylation- and oxyalkylation-susceptible solvent-soluble liquids and low-melting solids; and said reaction between (A) and (B) being conducted below the pyrolytic point of the reactants and the resultants of reaction; followed by a second step of reacting said diepoxide derived product with a monoepoxide; said monoepoxide being an alpha-beta alkylene oxide having not more than 4 carbon atoms and selected from the class consisting of ethylene oxide, propylene oxide, butylene oxide, glycide and methylglycide.

7. The process of claim 6 wherein the polyglycerol derivative has not over 5 glycerol nuclei.

8. The process of claim 6 wherein the polyglycerol derivative has not over 5 glycerol nuclei, and the nitrogen-containing compound contains at least 2 basic nitrogen atoms.

9. The process of claim 6 wherein the polyglycerol derivative has not over 5 glycerol nuclei, and the nitrogen-containing compound contains at least 2 basic nitrogen atoms and at least one radical having in excess of 8 carbon atoms.

10. The process of claim 6 wherein the polyglycerol derivative has not over 5 glycerol nuclei, the nitrogen-containing compound contains at least 2 basic nitrogen atoms and at least one radical having in excess of 8 carbon atoms and not over 22 carbon atoms.

11. The process of claim 6 wherein the polyglycerol derivative has not over 5 glycerol nuclei, the nitrogen-containing compound contains at least 2 basic nitrogen atoms and an aliphatic radical having at least 8 and not over 22 carbon atoms.

12. The process of claim 1 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

13. The process of claim 2 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

14. The process of claim 3 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

15. The process of claim 4 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

16. The process of claim 5 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

17. The process of claim 6 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

18. The process of claim 7 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

19. The process of claim 8 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

20. The process of claim 9 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

21. The process of claim 10 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

22. The process of claim 11 with the proviso that the hydrophile properties of the monoepoxide derived product employed in the form of a member of the class consisting of (a) the anhydro base as is (b) the free base, and (c) the salt of gluconic acid in an equal weight of xylene are sufficient to produce an emulsion when said xylene solution is shaken vigorously with one to three volumes of water.

References Cited in the file of this patent

UNITED STATES PATENTS

| | | |
|---|---|---|
| 2,233,383 | De Groote et al. | Feb. 25, 1941 |
| 2,281,419 | De Groote et al. | Apr. 28, 1942 |
| 2,507,910 | Keiser et al. | May 16, 1950 |
| 2,552,531 | De Groote | May 15, 1951 |
| 2,552,534 | De Groote | May 15, 1951 |
| 2,602,819 | Huscher et al. | July 8, 1952 |
| 2,615,853 | Kirkpatrick et al. | Oct. 28, 1952 |
| 2,629,740 | Carnes | Feb. 24, 1953 |